(12) United States Patent
Blumer

(10) Patent No.: US 11,682,152 B1
(45) Date of Patent: Jun. 20, 2023

(54) COLLABORATIVE ART AND COMMUNICATION PLATFORM

(71) Applicant: iScribble, Inc., Newland, NC (US)

(72) Inventor: Téa Blumer, Newland, NC (US)

(73) Assignee: ISCRIBBLE, INC., Newland, NC (US)

(*) Notice: Subject to any disclaimer, the term of this patent is extended or adjusted under 35 U.S.C. 154(b) by 46 days.

(21) Appl. No.: 17/371,831

(22) Filed: Jul. 9, 2021

Related U.S. Application Data

(60) Provisional application No. 63/052,742, filed on Jul. 16, 2020.

(51) Int. Cl.
| | |
|---|---|
| *G06T 11/60* | (2006.01) |
| *H04L 65/403* | (2022.01) |
| *G06Q 10/101* | (2023.01) |

(52) U.S. Cl.
CPC ............ *G06T 11/60* (2013.01); *G06Q 10/101* (2013.01); *H04L 65/403* (2013.01)

(58) Field of Classification Search
CPC ...... G06T 11/60; G06Q 10/101; H04L 65/403
See application file for complete search history.

(56) References Cited

U.S. PATENT DOCUMENTS

| | | | | |
|---|---|---|---|---|
| 6,850,249 B1* | 2/2005 | Gu | ........................ | G06T 7/246 345/589 |
| 8,006,189 B2 | 8/2011 | Dachs | | |
| 8,692,099 B2 | 4/2014 | Sitrick | | |
| 9,218,102 B1* | 12/2015 | Greenspan | ............ | G06F 3/0481 |
| 10,007,405 B2 | 6/2018 | D'Amore et al. | | |
| 10,007,893 B2 | 6/2018 | Emmerson | | |
| 2004/0237033 A1* | 11/2004 | Woolf | ..................... | G06Q 10/10 715/230 |
| 2007/0094328 A1* | 4/2007 | Birch | ..................... | G06Q 10/10 709/204 |
| 2007/0282614 A1* | 12/2007 | Dreke | .................. | G06Q 10/101 709/206 |
| 2008/0059539 A1* | 3/2008 | Chin | ...................... | G06Q 10/10 707/999.203 |
| 2009/0083637 A1* | 3/2009 | Skakkebaek | ........... | G06Q 10/10 715/751 |
| 2011/0016409 A1* | 1/2011 | Grosz | .................. | G06K 9/6267 715/753 |
| 2012/0206577 A1* | 8/2012 | Guckenberger | ..... | G09B 19/003 348/47 |
| 2012/0284197 A1* | 11/2012 | Sitrick | ............... | G06Q 10/0631 705/301 |
| 2013/0027404 A1* | 1/2013 | Sarnoff | .................. | G06F 3/1454 345/522 |
| 2014/0074807 A1* | 3/2014 | Kane-Esrig | ......... | G06F 16/2365 707/695 |
| 2015/0074001 A1 | 3/2015 | Lee | | |

(Continued)

*Primary Examiner* — Maurice L. McDowell, Jr.
(74) *Attorney, Agent, or Firm* — Neo IP

(57) ABSTRACT

Collaborative art and communication platform provides a single platform where artists can collaborate, in real-time or near-real-time, on works of art. The platform's communication functionalities enable efficient and cost-effective communication between artists, whether artists are working together on a piece of art, coordinating a potential project, critiquing works of art on the platform, or discussing art in general. The platform enables artists to create and share works of art to all platform users.

18 Claims, 26 Drawing Sheets
(23 of 26 Drawing Sheet(s) Filed in Color)

200

(56) References Cited

U.S. PATENT DOCUMENTS

| | | |
|---|---|---|
| 2015/0170225 A1 | 6/2015 | Belleroche |
| 2016/0048486 A1* | 2/2016 | Lopategui ............. G06F 40/197 715/229 |
| 2017/0185268 A1* | 6/2017 | Zeng ................... G06F 3/04842 |
| 2017/0372455 A1* | 12/2017 | Winnemoeller .......... G06T 7/13 |
| 2018/0089349 A1* | 3/2018 | Rezgui ................. G06F 40/103 |
| 2018/0293766 A1* | 10/2018 | Carlos .................. G06F 40/171 |

* cited by examiner

701

701

900

1300

1300

1300

1300

1300

1300

1800

1900

COLLABORATIVE ART AND COMMUNICATION PLATFORM

CROSS REFERENCES TO RELATED APPLICATIONS

This application claims priority to and the benefit of U.S. Provisional Application No. 63/052,742 filed Jul. 16, 2020, which is incorporated by reference in its entirety.

BACKGROUND OF THE INVENTION

1. Field of the Invention

The present invention relates to a digital art platform, and more specifically to a real-time, collaborative art and communication platform.

2. Description of the Prior Art

It is generally known in the prior art to provide software and platforms that enable individual artists and designers to create and share multimedia projects. However, much of the prior art is limited to multimedia projects related to film and music. Moreover, these platforms focus heavily on the editing aspects associated with film and music, with minimal functionality supporting the creation of multimedia. While post-processing and editing are essential processes in relation to art, they are only two components of a larger process. The result is a market where the post-creation processes and editing features receive the greatest updates, leaving the actual creation process and functions in a dilapidated state.

The actual artists responsible for creating these multimedia projects are further disadvantaged, due to a lack of market innovation and the expansive costs associated with using existing platforms to collaborate with other artists. Artists are required to rely on multiple software applications in order to efficiently and accurately coordinate on collaborative projects. This issue compounds as the scope of each individual project increases, leading to an expensive and inefficient process. Artists end up spending more time handling issues with coordination and communication, instead of focusing on the creation of a work of art.

Furthermore, available platforms only offer practical solutions for collaboration in the areas of film and music, ignoring all other forms of art, whether digital or otherwise. Artists working on projects outside of film and music are left with platforms with limited features and functionalities. While the global film market is worth an estimated $136 billion U.S. dollars (USD) and the record music industry worth an estimated $19.1 billion USD, the current global art market is worth over $67 billion USD. This value represents a substantial market value, and presents a viable opportunity for innovation.

Prior art patent documents include the following:

U.S. Pat. No. 8,006,189 for System and method for web based collaboration using digital media by inventor Dachs, filed Jun. 21, 2007 and issued Aug. 23, 2011, is directed to a system and method configured to allow production team members to view, organize and manage production of a motion picture. The system and method allows the production team members to organize the project script; extract the script into scenes and slates; view, organize, select and collaborate on uploaded digital media and takes for each scene as well as uploaded audio, music or special effects that are to be applied to the product. The system tracks versions of the project by monitoring each change as well. The system also allows production member to organize project calendars, tasks associated with projects, contacts, notes, budgeting and other facets of the project. The system incorporates security measures which allow certain members of the production team to only have access to designated high-security material.

U.S. Pat. No. 10,007,405 for Systems and methods of creative work collaborative systems by inventors D'Amore, et al., filed Aug. 3, 2015 and issued Jun. 26, 2018, is directed to systems, methods, and tangible computer-readable storage mediums for selecting a user for collaboration on a work, negotiating aspects of a collaboration and generating and managing agreements for collaboration.

U.S. Patent Publication No. 2009/0083637 for Method and system for online collaboration by inventors Skakkebaek, et al., filed Sep. 8, 2008 and published Mar. 26, 2009, is directed to a method and system for online collaboration enabling multiple users to gather content electronic content items from various sources. The content items are associated with a particular user and with each other. Users can find other users that have similar content or personal information. A collaboration session is hosted between multiple participating users that allows the users to access and modify common content during the same session. Modification includes a user marking or labeling content with a label that includes metadata regarding the content. Information from the session, including modifications, is automatically processed and stored as result data. An example of result data is a flash card created for the purpose of language learning. The result data is accessible by the user later for further use and/or modification.

U.S. Patent Publication No. 2015/0074001 for Method for crowdsourcing and creating a collaborative multimedia project and product by inventor Lee, filed Sep. 11, 2013 and published Mar. 12, 2015, is directed to a method and system utilizing crowdsourcing for content generation and production of multimedia through online collaboration. The method not only creates a platform for online content providers to gain exposure and get feedback, it uses these broad powers of the crowd to select, refine and produce media that enables broader production and reward of partial contributions and serves a larger audience with self-selected interest.

U.S. Pat. No. 8,692,099 for System and methodology of coordinated collaboration among users and groups by inventor Sitrick, filed Nov. 1, 2007 and issued Apr. 8, 2014, is directed to a musical workstation system produces a display presentation in one of a musical composition responsive to musical composition data and responsive to one or both of input variables and a selected operating mode. The system is comprised of (1) means to provide the musical composition data (such as local storage (ROM, RAM, CD-ROM, hard disk etc.), or via a communications interface to an external device (such as another music workstation, a master controller, a computer), a memory, a selection subsystem, a controller, and a display subsystem. The memory selectively stores the received original musical compositions. The selection subsystem determines a selected operating mode and display format. The controller, responsive to the selection subsystem, provides means for selectively controlling the storing of the musical composition data in memory and selectively processing (e.g. altering) the stored musical composition data responsive to the selected operating mode and the input variables to produce a particular one of a plurality of processed results, such as external communications, operating, mode, transformation to derivative musical compositions, etc. The music workstation can coordinate communications, or be a slave device, with one or more external devices, such as other music workstations, a master workstation, a controller, etc. The display system provides for selection of original compositions, creation of derivative compositions, distribution of compositions, monitoring of each performer's performance, group virtual performances, and also allows for local and distributed retrieval and editing of musical compositions.

U.S. Pat. No. 10,007,893 for Methods for online collaboration by inventor Emmerson, filed Feb. 2, 2015 and issued Jun. 26, 2018, is directed to systems and methods for creating and editing collaborative music compositions via a computer network, including remote uploading tracks by musicians, and for creating and joining a band, wherein the system and methods provide for at least one musician to join a virtual group of at least one other musician for the purpose of virtual collaborative creating and/or editing music tracks remotely, via an online network and interactive website therefor.

U.S. Patent Publication No. 2015/0170225 for Collaborative platform system for live entertaining by inventor Belleroche, filed Nov. 26, 2014 and published Jun. 18, 2015, is directed to a method of collaboratively promoting and consuming a plurality of multimedia content. The method may embrace and promote easy access to new releases (New Movies/Films, music, games, videos, sportive events, etc.) to everyone, everywhere, anytime (whenever) through the use of all kinds of possible channels (digital methods) of distribution. The method may comprise a one-world platform configured to provide access to the plurality of multimedia content to a plurality of users having a profile, wherein the plurality of multimedia content may be accessed through at least one of a purchase and a subscription; providing a Bellgoo platform connected to the one-world platform, wherein the Bellgoo platform is configured to provide group interactions through multiple interaction configurable modalities; providing an anti-piracy module configured to prevent the distribution of pirated content over the one-world platform; simultaneously consuming a predetermined portion of the plurality of multimedia content over the one-world platform on the part of the plurality of users, whereby scheduling of group view by the plurality of user is promoted; and sharing commentary on the predetermined portion of the plurality of multimedia content part over the Bellgoo platform on the part of the plurality of local, mixed and global group users.

SUMMARY OF THE INVENTION

The present invention relates to a digital art platform, and more specifically to a real-time, collaborative art and communication platform.

It is an object of this invention to provide for a collaborative art and communication platform, supporting simultaneous user contribution and collaboration.

In one embodiment, the present invention includes a web-based collaboration platform for creating a work of art including a server including a processor, a memory, and a database and a Graphical User Interface (GUI) accessible via at least two devices connected over a network to the server, wherein the GUI provides for editing of a canvas in real-time via at least one input mechanism by at least two accounts associated with the at least two devices, wherein the canvas includes at least two layers, wherein edits to one layer of the at least two layers are separate from edits to other layers of the at least two layers, wherein each layer is assigned to an assigned device of the at least two devices and is editable only by the assigned device, wherein the database is operable to save each distinct input made via the at least one input mechanism to the at least two layers of the canvas, and wherein the GUI is operable to provide playback of the inputs made to the at least two layers of the canvas, thereby providing for a step-by-step recreation of the work of art after completion of the work of art.

In another embodiment, the present invention includes a web-based collaboration platform for creating a work of art including a server including a processor, a memory, and a database and a Graphical User Interface (GUI) accessible via at least two devices connected over a network to the server, wherein the GUI provides for editing of a canvas in real-time via at least one input mechanism by at least two accounts associated with the at least two devices, wherein the canvas includes at least two layers, wherein edits to one layer of the at least two layers are separate from edits to other layers of the at least two layers, wherein the GUI further includes a chat GUI operable to receive text input from the at least two devices, wherein the text input is operable to be viewed by the at least two devices, and wherein the GUI further includes an account feed GUI, wherein the account feed GUI includes a list of friend accounts currently active on the platform, a list of currently active account streams, favorited sessions, recent posts from other accounts, on-going events, and/or recommended sessions or recommended friend accounts.

In yet another embodiment, the present invention includes a web-based collaboration platform for creating a work of art including a server including a processor, a memory, and a database and a Graphical User Interface (GUI) accessible via at least two devices connected over a network to the server, wherein the GUI provides for editing of a canvas in real-time via at least one input mechanism by at least two accounts associated with the at least two devices, wherein the at least one input mechanism includes an area picker tool and an auto circles tool, wherein the area picker tool provides for selection of at least one canvas element and creation of a color representing an average of the colors of the at least one canvas element, and wherein the auto-circles tool provides for blending of colors of a selected portion of the canvas to create multiple circles with blends of the colors of the portion of the canvas, wherein each circle of the multiple circles includes a different blend of the colors of the portion of the canvas than the other circles of the multiple circles.

These and other aspects of the present invention will become apparent to those skilled in the art after a reading of the following description of the preferred embodiment when considered with the drawings, as they support the claimed invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
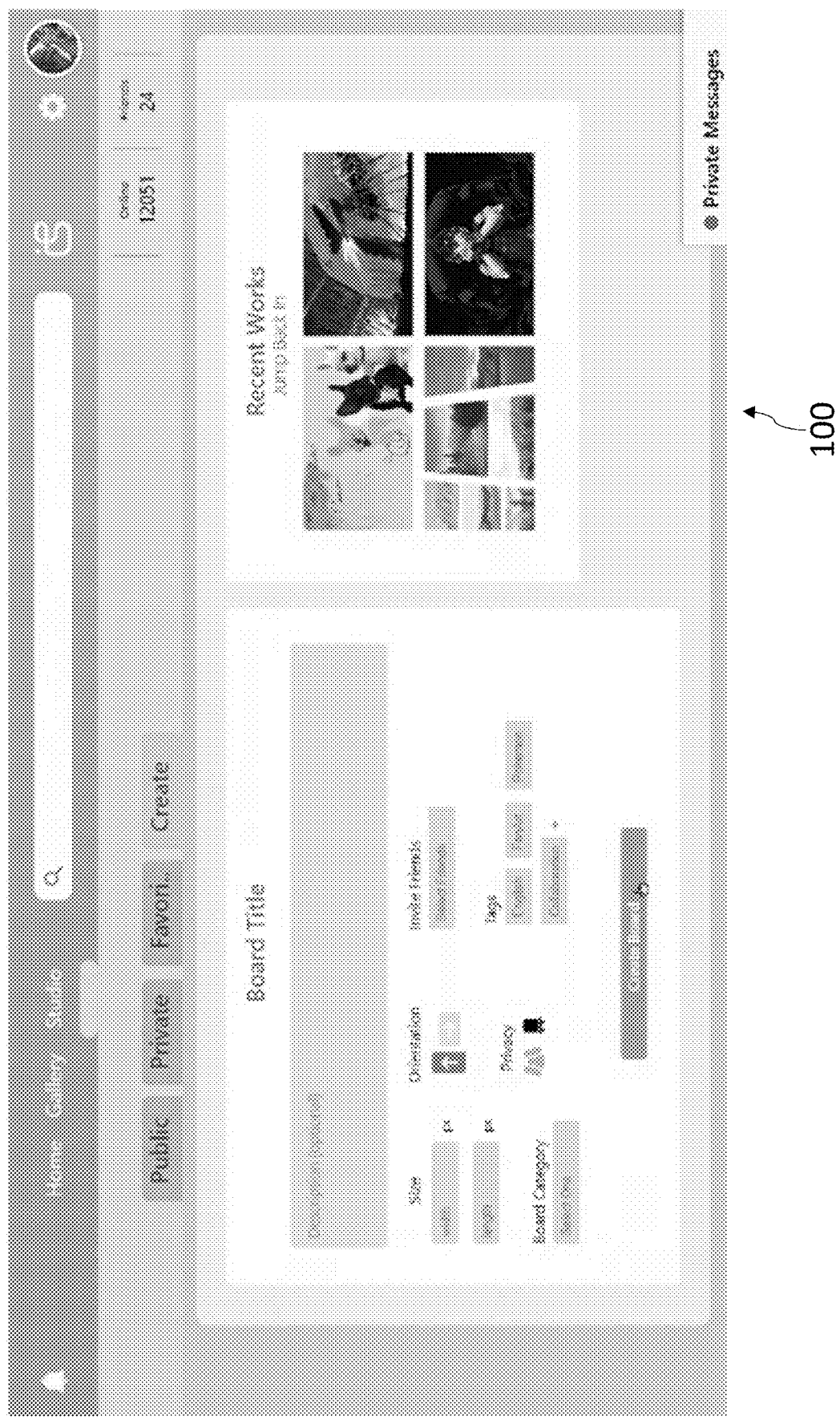
FIG. 1 illustrates a Create Session Graphical User Interface (GUI) according to one embodiment of the present invention.

The present invention is generally directed to a digital art and communications platform, and more specifically to a platform supporting simultaneous, multi-user collaboration using the platform's universal drawing software. The universal drawing software enables users to collaborate, in real-time, on artistic creations. In addition, the platform provides instant communication and social networking functionalities, enabling users to discuss, critique, and work together in creating new works of art. The systems and methods of the present invention provide an improved platform for artists to collaborate on and discuss works of art in real-time or near-real time.

In one embodiment, the present invention includes a web-based collaboration platform for creating a work of art including a server including a processor, a memory, and a database and a Graphical User Interface (GUI) accessible via at least two devices connected over a network to the server, wherein the GUI provides for editing of a canvas in real-time via at least one input mechanism by at least two accounts associated with the at least two devices, wherein the canvas includes at least two layers, wherein edits to one layer of the at least two layers are separate from edits to other layers of the at least two layers, wherein each layer is assigned to an assigned device of the at least two devices and is editable only by the assigned device, wherein the database is operable to save each distinct input made via the at least one input mechanism to the at least two layers of the canvas, and wherein the GUI is operable to provide playback of the inputs made to the at least two layers of the canvas, thereby providing for a step-by-step recreation of the work of art after completion of the work of art.

In another embodiment, the present invention includes a web-based collaboration platform for creating a work of art including a server including a processor, a memory, and a database and a Graphical User Interface (GUI) accessible via at least two devices connected over a network to the server, wherein the GUI provides for editing of a canvas in real-time via at least one input mechanism by at least two accounts associated with the at least two devices, wherein the canvas includes at least two layers, wherein edits to one layer of the at least two layers are separate from edits to other layers of the at least two layers, wherein the GUI further includes a chat GUI operable to receive text input from the at least two devices, wherein the text input is operable to be viewed by the at least two devices, and wherein the GUI further includes an account feed GUI, wherein the account feed GUI includes a list of friend accounts currently active on the platform, a list of currently active account streams, favorited sessions, recent posts from other accounts, on-going events, and/or recommended sessions or recommended friend accounts.

In yet another embodiment, the present invention includes a web-based collaboration platform for creating a work of art including a server including a processor, a memory, and a database and a Graphical User Interface (GUI) accessible via at least two devices connected over a network to the server, wherein the GUI provides for editing of a canvas in real-time via at least one input mechanism by at least two accounts associated with the at least two devices, wherein the at least one input mechanism includes an area picker tool and an auto circles tool, wherein the area picker tool provides for selection of at least one canvas element and creation of a color representing an average of the colors of the at least one canvas element, and wherein the auto-circles tool provides for blending of colors of a selected portion of the canvas to create multiple circles with blends of the colors of the portion of the canvas, wherein each circle of the multiple circles includes a different blend of the colors of the portion of the canvas than the other circles of the multiple circles.

While digital art platforms exist, these focus on individual creation and lack the necessary tools and functionalities required to accommodate multiple artists working on a single piece of digital artwork simultaneously. If multiple artists want to collaborate on a single piece of digital art, existing platforms require these artists to coordinate amongst themselves times in which each individual artist can contribute. What results is a platform with limited collaborative functionality, and without the capability to support simultaneous users and/or artists working together in real-time or near-real time.

Moreover, existing platforms lack communication and/or social networking functions, making not only collaboration difficult, but impacting an artist's ability to coordinate and communicate with other artists. Instead, artists must rely on third-party communication platforms and tools in order to effectively and efficiently managed and coordinate collaborative projects.

Thus, there is a need for a collaborative art and communication platform that enables users to work together, simultaneously, in creating and discussing works of art.

None of the prior art integrates artificial intelligence (AI), machine learning (ML), natural language processing (NLP), and/or other computer learning techniques and technologies with universal art software, enabling users to collaborate on individual works of art, simultaneously, with other users.

Referring now to the drawings in general, the illustrations are for the purpose of describing one or more preferred embodiments of the invention and are not intended to limit the invention thereto.

In one embodiment, the collaborative art and communication platform is a web-based platform. Operating as a web-based platform enables users to not only interact with the platform using a mouse and keyboard setup, but also enables users to create using pens and tablets designed specifically for digital art. Pens include, but are not limited to, smart pens, styluses, digital art brushes, and/or smart pencils. In one embodiment, the collaborative art and communication platform is a Software-as-a-Service (SaaS) platform. Using a SaaS model, the collaborative art and communication platform is operable to provide a multiplicity of user tiers at a multiplicity of price points. Each of the multiplicity of user tiers offers an increasing number of features as the tiers increase among the multiplicity of price points.

In one embodiment, the collaborative art and communication platform includes a "basic" subscription tier. If a user is subscribed to the basic subscription tier, by paying a corresponding basic subscription tier price, the platform is operable to provide users with functionality including, but not limited to, minimal collaborative digital art tools. Minimal collaborative digital art tools include, but are not limited to, a multi-user collaborative artwork Graphical User Interface (GUI) and user-to-user chat functionality. In one embodiment, the basic subscription tier is offered for free by the collaborative art and communication platform.

In one embodiment, the collaborative art and communication platform includes a "classic" subscription tier. The classic subscription tier is operable to provide users with all of the functionalities available in the basic subscription tier, as well as additional functionalities and tools including, but not limited to, a set of advanced artwork tools, free advertisement availability, and/or collaborative art replays. In one embodiment, the classic subscription tier is priced above the basic subscription tier.

In one embodiment, the collaborative art and communication platform includes a "premium" subscription tier. The premium tier provides users with all of the functionalities available in the basic user tier, as well as the classic user tier. In addition, the platform provides additional tools and functionalities to users subscribing to the premium tier including, but not limited to, the ability to export works of art from the platform into a specified file and/or the ability to sell completed works of art to other users on the platform. In one embodiment, the premium subscription tier includes a corresponding premium subscription tier price. In one embodiment, the premium subscription tier price is priced above the classic subscription tier.

In one embodiment, the collaborative art and communication platform includes a "professional" subscription tier. The professional subscription tier includes all of the previously listed functionalities associated with the basic, classic, and premium subscription tiers. In addition, the professional subscription tier further includes, but is not limited to, a branded streaming space, a professional portfolio space, and/or a set of business tools. In one embodiment, the professional subscription tier includes a corresponding professional subscription tier price. In one embodiment, the subscription tier price is priced above the premium subscription tier.

In another embodiment, the collaborative art and communication platform is a mobile application. Advantageously, deploying the platform as a mobile application enables users to remain connected to their projects and friends anywhere in the world.

In order to take advantage of the platform's features and functionalities, users of the collaborative art and communication platform are first required to create an account in order to login and access the platform features. User account information includes, but is not limited to, a username, a user password, a user email address, a user phone number, a user age, a username recovery option, a password recovery option, user employment information, a user type, a user experience and/or skill level, a preferred user art style, a preferred user art theme, a two-factor authentication (2FA) indicator, a user tier level, and/or at least one digital art upload.

In addition to providing standard user accounts, the collaborative art and communication platform enables users to create teaching accounts. Teaching accounts indicate that the user is operable to make use of the collaborative art and communication platforms classroom tool set. The classroom tool set includes, but is not limited to, an Art Class Graphical User Interface (GUI), an Enrolled Student GUI, a Student Monitoring GUI, a Student Critique GUI, and/or a Lesson Planning GUI. In one embodiment, a teaching account indicates that the user is associated with a professional organization, university, and/or graduate school with a primary focus corresponding to art and/or art education. In another embodiment, a teaching account indicates that the user has selected to teach other users without an association with a professional organization, university, and/or graduate school with a primary focus corresponding to art and/or art education.

In one embodiment, the platform enables users to create guest accounts. Guest accounts enable a one-time login for users without an account and enable guest account users limited collaborative art and communication platform functionalities. Once a guest user has initiated the sign-out process and/or logged out, the platform is operable to provide the guest user account with the option of creating an account.

Each user account includes a corresponding user profile, where the user profile is visible to all other platform users. User profiles include, but are not limited to, a user name, a user profile image, a user profile description, at least one work of art by the user, a list of friends, a preferred user style, a preferred user theme, a user skill and/or experience level, a number corresponding to the number of messages posted on the platform, and/or at least one user group.

Once a user has logged in to the collaborative art and communication platform, either as a guest or using a platform account, the platform is operable to provide users with universal drawing software, communication, and/or social networking functionalities through Graphical User Interfaces (GUIs). Users are able to select a plurality of art session options including, but not limited to, creating a new session, continuing a previous session, joining a new session, watching an in-progress session, and/or watching a recording of a completed session. Communication functionalities include, but are not limited to, user-to-user communication, basic chat rooms supporting a multiplicity of users, a multiplicity of forums, art tutorial sessions, and/or virtual classrooms.

By creating a new session, the collaborative art and communication platform enables users to create a session with at least one canvas. Sessions are operable to include a multiplicity of canvases. Each canvas is initially blank (i.e., white, two-dimensional plane) displayed to users via a Canvas GUI. Moreover, each of the multiplicity of canvases initially includes a single layer. By employing layers in each of the multiplicity of canvases, the collaborative art and communication platform provides advanced digital artwork functionalities to users, enabling them to separate the varying aspects of a work of art into a multiplicity of layers. Each of the multiplicity of layers is operable for editing, encompassing all the functionality available to the multiplicity of canvases. Splitting an individual work of art into separate layers further enables users to work on different portions of a given work of art without disturbing and/or editing the entire work of art. Advantageously, this enables users to include an advanced level of detail into each and every work of art on the platform, as users can work on individual layers without impacting any remaining layers.

When a user creates a new session, the user is designated as the session owner. As the session owner, the platform enables the user to set permissions for the session including, but not limited to, chat permissions, drawing permissions, joining permissions, and/or viewing permissions. Chat permissions refer to the session owner's ability to enable or disable session chat features including, but not limited to, user-to-user chat and/or session chat. Drawing permissions refer to the session owner's ability to restrict other users from contributing and/or collaborating on a work of art in the session. Joining permissions correspond to whether or not other users are able to enter the session, including, but not limited to, when other users are joining for the purpose of collaborating on a work of art, when other users are joining for the purpose of viewing users work on a piece of art, and/or when other users are joining for the purpose of communicating with the users in the session. Viewing permissions include, but are not limited to, user-to-user chat and/or session communications.

FIG. 1 illustrates a Create Session Graphical User Interface (GUI) 100 according to one embodiment of the present invention. The Create Session GUI 100 enables users to specify session attributes including, but not limited to, a session title, a session description, a session size, a session orientation, a session category, a session privacy (e.g., public or private), at least one session tag, and/or session invite list. The session title and/or session description serves as a means to not only notify other users what the particular session is creating, but also provides the platform with session search metrics. In one embodiment, the session size includes a pixel width and/or a pixel length. The session orientation specifies whether a particular session is creating a work of art using a "portrait" orientation or an "landscape" orientation. The session category provides an indication of the subject matter of the session (e.g., trees, animals, etc.). The session privacy enables users to select whether a session is public, enabling other users to join without an invite, or private, requiring users first receive an invite to join the session. The at least one session tag enables users to specify individual attributes concerning the session, separate from the session category. For example, where a session category is listed as "animals," a session tag is operable to provide further details concerning a specific subject matter for the session, such as "cats" and/or "birds." The session invite list enables users to specify a list of users able to join the session, while simultaneously preventing session accessibility by all other platform users, and sends an invite notification to any user present within the list of users.

Furthermore, session owners are able to set a purpose for the session. Examples of session purposes include, but are not limited to, professional, free drawing, an art style, a theme, a setting, a subject, and/or a location. The platform is operable to store the session purpose, increasing the efficiency of session searching for other platform users.

Once initial session parameters have been created, the collaborative art and communication platform provides users with a Canvas Graphical User Interface (GUI) that acts as a digital canvas for users of the platform. The Canvas GUI serves as the primary creation space of the platform and operates using a "Stroke-based" engine. Through the use of the stroke-based engine, the platform is operable to save and/or record every stroke made by every user on any canvas present on the platform, where a stroke corresponds to a user's cursor movement on a canvas. Advantageously, the stroke-based engine enables users of the platform to review the creation of an individual work of art in its entirety. Thus, the platform not only provides users with a unique set of tools and/or functionalities for the creation of art, but further acts as database for the lifecycle of the platform. While traditional platforms enable users to view completed works of art by others, users are unable to view the actual creation of these works of art on a stroke-by-stroke basis.

Figure 2:
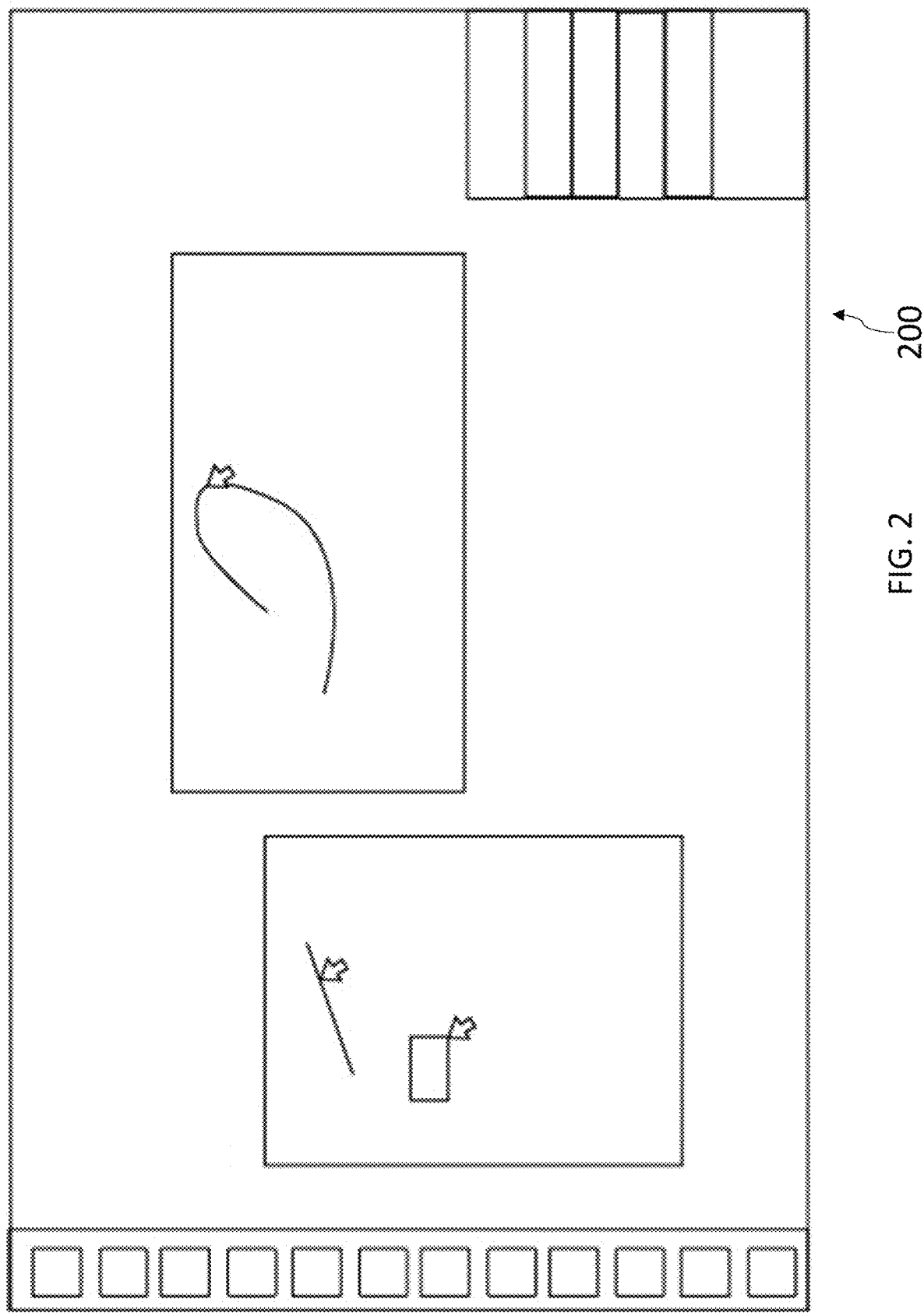
FIG. 2 illustrates Canvas GUI according to one embodiment of the present invention.

FIG. 2 illustrates a Canvas GUI 200 according to one embodiment of the present invention. The Canvas GUI 200 includes, but is not limited to, a multiplicity of canvases, a set of drawing tools, a list of session users, a user cursor indicator, a list of session options, and/or a list of canvas layers corresponding to each of the multiplicity of canvases. Advantageously, users are able to view both their own canvas and the canvas of any other users currently collaborating within a session.

Figure 3:
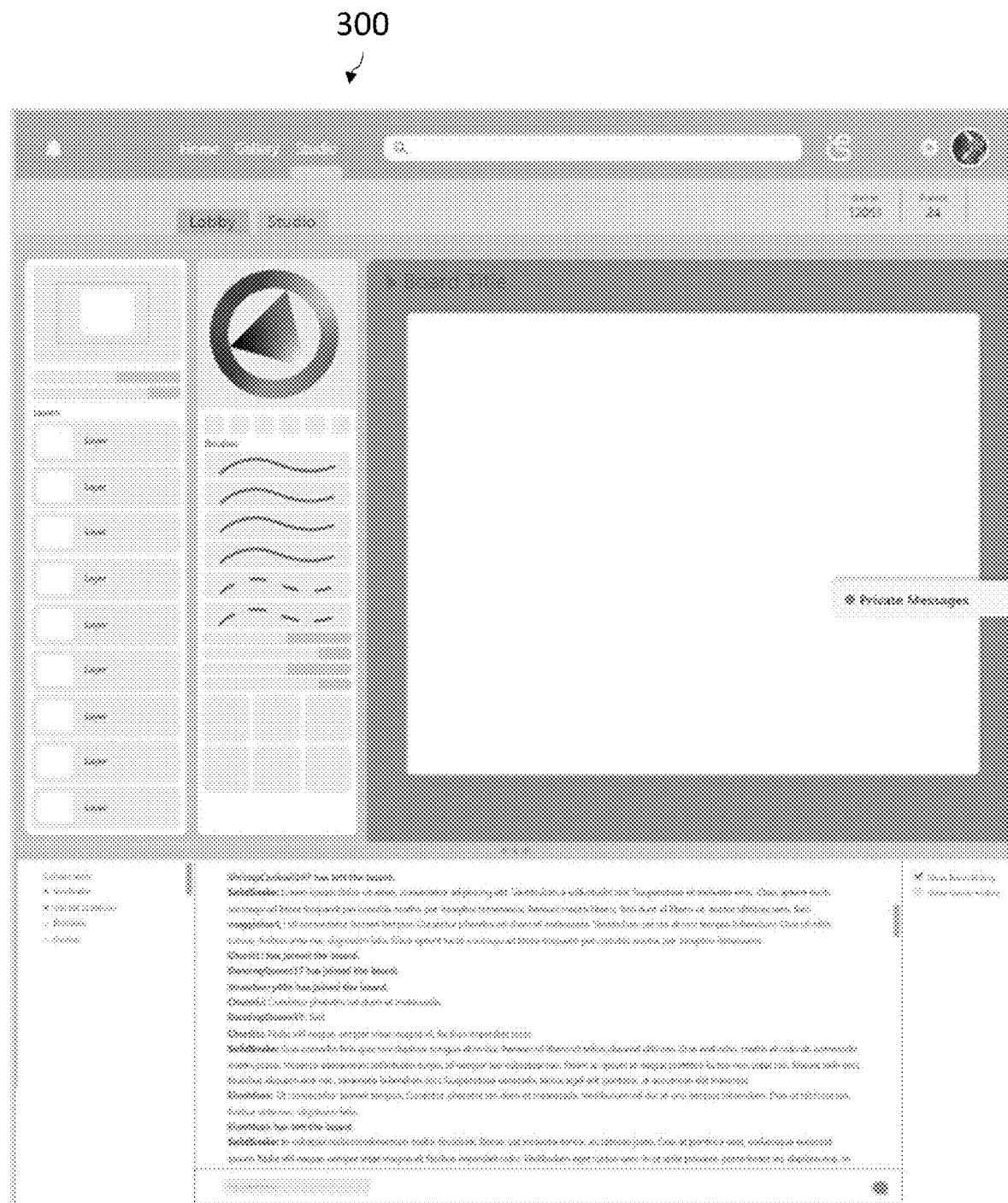
FIG. 3 illustrates a Canvas GUI according to another embodiment of the present invention.

FIG. 3 illustrates a Canvas GUI 300 according to another embodiment of the present invention. In addition to the previously mentioned functionalities, the Canvas GUI 300 further enables users to view all of the current canvases that make up a work of art via a layer list containing a plurality of layers and provides users with a plurality of artistic tools including, but not limited to, a plurality of brush options and/or a color selection tool. The plurality of brush options provides users with features including, but not limited to, a brush style, a brush thickness, a brush transparency, and/or a brush location (e.g., foreground, background, etc.). In one embodiment, each of the plurality of layers in the layer list includes at least one canvas. Thus, the Canvas GUI 300 provides quick and easy access to every element making up a piece of art, whether it be a particular lay from the layer list or a cursor modification (e.g., pen, brush, etc.).

Figure 4:
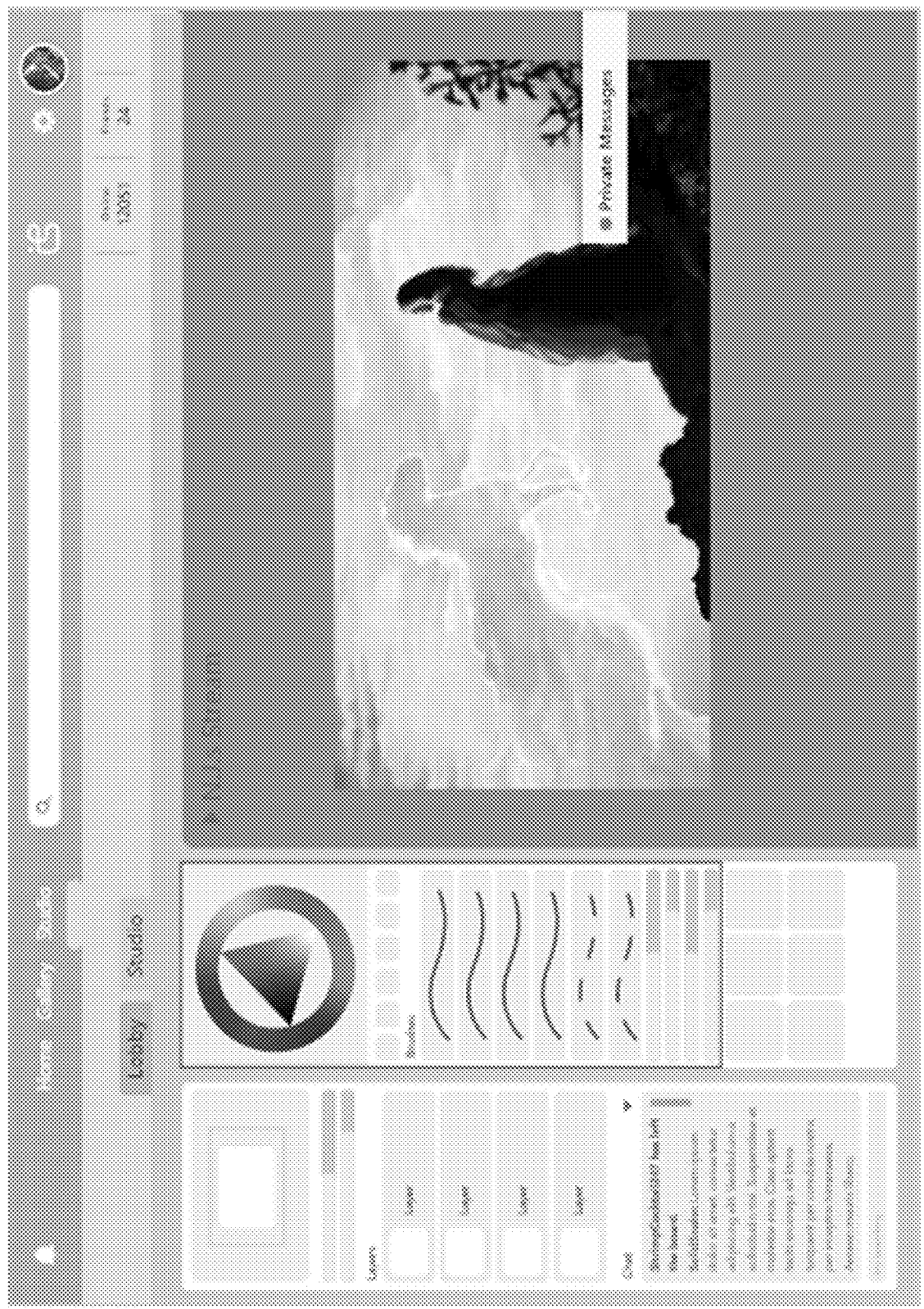
FIG. 4 illustrates a Canvas GUI according to another embodiment of the present invention.

FIG. 4 illustrates a Canvas GUI 400 according to another embodiment of the present invention. In addition to the aforementioned features, the Canvas GUI 400 is further operable to indicate whether or not the current session is a streaming session. A streaming session refers to a session that is available for viewing, in real-time, by other users. For example, if a session creator has designated a session as a streaming session, the session title is appended with the phrase "Stream."

Figure 5:
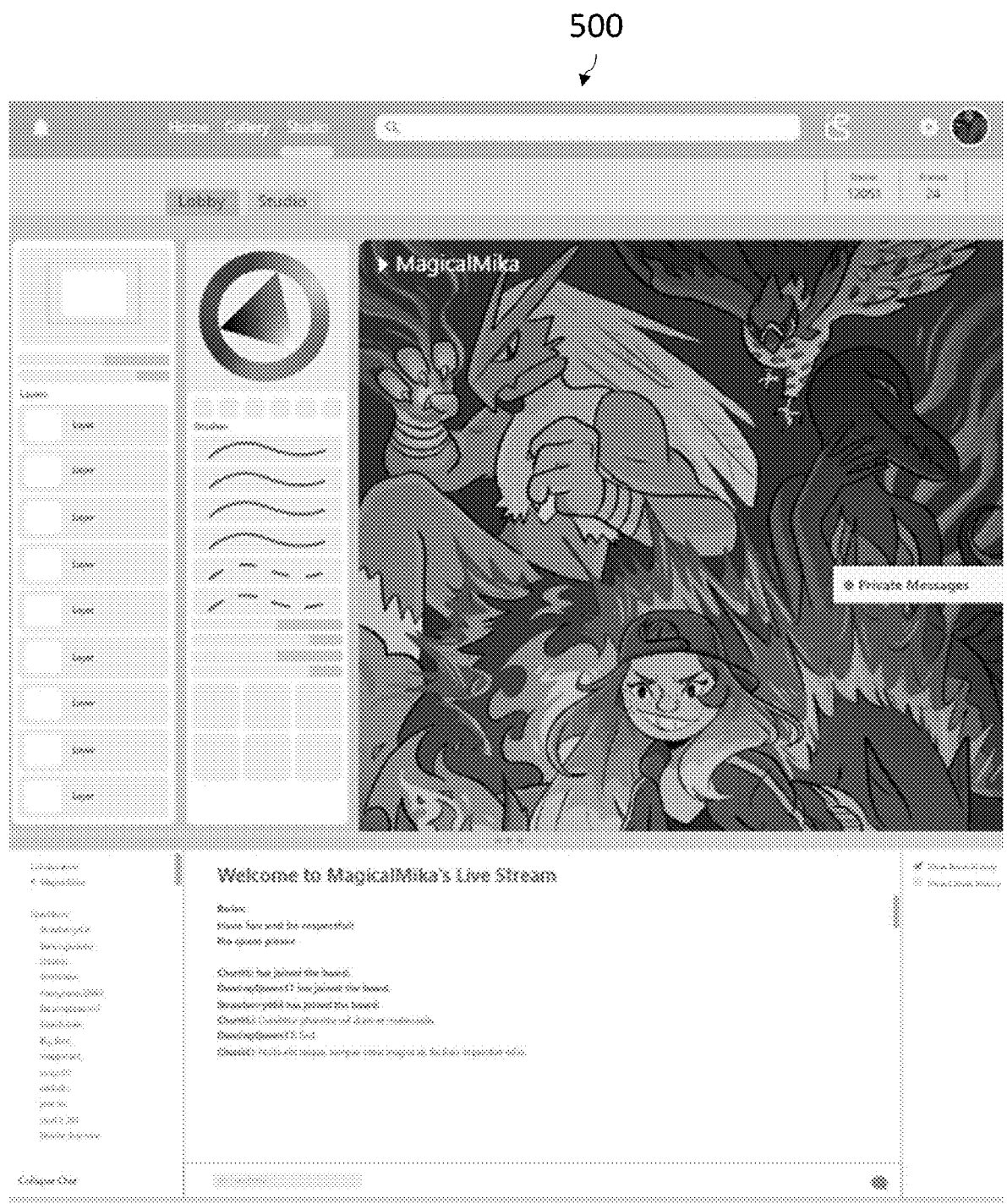
FIG. 5 illustrates a Canvas GUI according to yet another embodiment of the present invention.

FIG. 5 illustrates a Canvas GUI 500 according to yet another embodiment of the present invention. In one embodiment, where the session is a streaming session, the platform is operable to enable session creators to specify a session welcome message, wherein the session welcome message is displayed, via a chat-box, to all users who enter the session as spectators. In addition to the session welcome message, the platform further enables session creators to create a set of rules for the session. By providing session creators with the ability to create and/or enforce a set of rules for the session, the platform is operable to safeguard users against potential spam, platform abuse, material violating platform guidelines, and/or other potential malicious material.

In one embodiment, the platform enables session creators to remove spectator users from the session, should the spectator user violate a set of session rules and/or a set of platform rules. The platform is operable to enable session creators to remove a spectator user from a current session and/or remove the spectator user from all future sessions created by the session creator.

Figure 6:
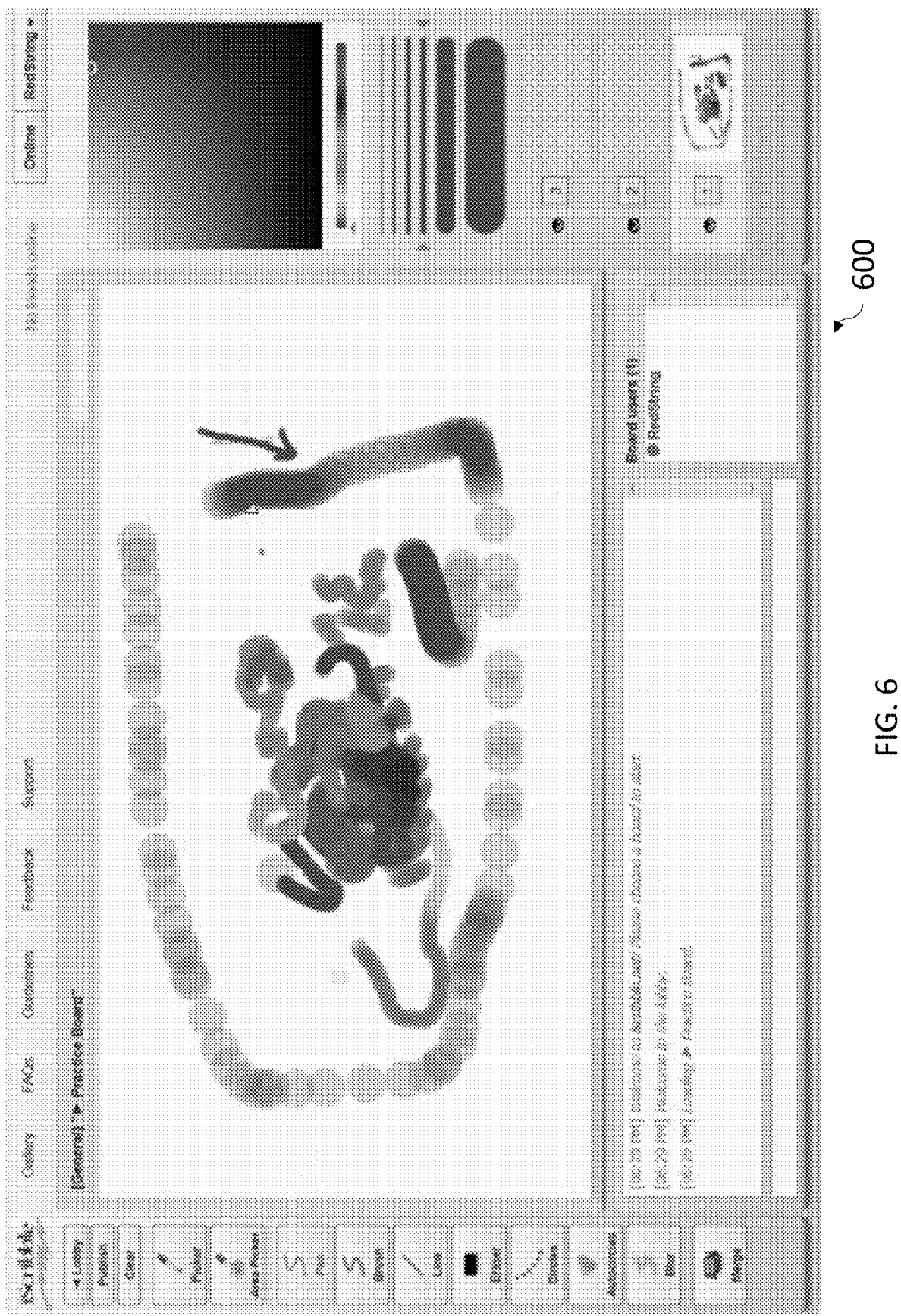
FIG. 6 illustrates a Canvas GUI according to yet another embodiment of the present invention.

FIG. 6 illustrates a Canvas GUI 600 according to yet another embodiment of the present invention. In addition to the previously mentioned features and/or functionalities, the Canvas GUI 600 further includes a picker tool, an area picker tool, a pen tool, a brush tool, a line tool, an eraser tool, a circles tool, an auto-circles tool, a blur tool, a merge tool, a Publish GUI button, and/or a Clear GUI button.

The picker tool enables a user to select an individual pixel and replicate that pixel, including the color of the pixel. In one embodiment, the color of the pixel is represented using an HTML color code, a Hex color code, an RGB value, and/or an HSL value.

The area picker tool enables a user to select canvas elements and average the colors of those canvas elements. The area picker tool determines the colors in the selected canvas elements, determines the number of pixels associated with each color in the canvas elements, and produces the average of the colors for canvas elements. In one embodiment, the colors are represented using HTML color codes, Hex color codes, RGB values, and/or HSL values, and these codes and/or values are averaged. The area picker tool supports a multiplicity of pixel radius options including, but not limited to, five pixels, ten pixels, fifteen pixels, twenty pixels, and/or thirty pixels. Once a user has selected a pixel radius and clicked on an area of a canvas, the area picker tool analyzes the area encompassing the selected pixel radius. The area picker tool calculates and determines all of the color values or codes present within the specified pixel radius. Once all of the color values or codes present within the specified pixel radius are determined, the area picker tool calculates an average color value and selects the corresponding color associated with the average color value as the user's active color. In one embodiment, the present invention is operable to convert color codes to color values. When the user next interacts with the platform's GUI, the color drawn by the user is the active color. This results in the area of canvas corresponding to the specified pixel radius where color values have been blended together, creating a smooth transition from one color to the next. In one embodiment, the platform automatically calculates a pixel radius based on where the user's cursor and/or mouse is located within a canvas. While existing art platforms support some color selection and blending functionalities, these require users to first select a desired color and then select a color to blend with the desired color. Unlike existing platforms, the collaborative art and communication platform of the present invention is operable to perform this automatically, without requiring the user to perform separate interactions when blending colors.

The pen tool enables users to create and/or edit with a finely detailed stroke. The pen tool provides users with a drawing cursor that is smaller in size when compared against a drawing cursor for the brush tool, enabling users to edit small details present on a canvas.

The brush tool provides users with a drawing curser that is larger in size when compared against the drawing cursor for the pen tool, enabling users to edit larger areas of a canvas with single and/or multiple strokes. Both the pen tool and the brush tool are operable to have their respective cursors resized, providing increased user control for drawing on the canvas.

The line tool enables users to create a straight line anywhere on the canvas. In one embodiment, a line is created, using the line tool, once a user has selected a line start point and a line end point. After selection, the line start point and/or the line end point are operable for modification.

The eraser tool enables users to quickly erase elements on a canvas. The eraser tool, similar to the brush and/or the pen tools, is operable for resizing, providing users with options for erasing both small and large elements on a canvas.

The circle tool enables users to create brush strokes on the canvas. The space between brush strokes and/or the length of the brush strokes is determined by the speed at which the cursor or other input mechanism is moved across the canvas. In one embodiment, the brush strokes are circular or rounded. By way of example and not limitation, the distance between the brush strokes increases as the speed of movement across the canvas via the input mechanism increases. Conversely, the distance between the brush strokes decreases as the speed of movement across the canvas via the input mechanism decreases. Brush strokes are circles in one embodiment of the present invention, but are also operable to be any shape or design known in the art. Input mechanisms include a cursor of a mouse which functions via click activation, a touchscreen input via a stylus, a human hand or finger, etc., a keyboard, and/or any other hardware or software based inputs known in the art.

The auto-circles tool enables users to select a portion of a canvas and blends the colors of the portion of the canvas to create multiple circles with blends of the colors of the portion of the canvas. Preferably, a point on a canvas is selected using a cursor or other input mechanism recited herein, and the cursor or other input mechanism is dragged or pulled over the canvas to select a portion of the canvas for creation of multiple circles, wherein each circle of the multiple circles includes an average of at least two colors in the selected portion of the canvas. In one embodiment, the auto-circles tool requires a final input such as a click input or a touchscreen input to create the multiple circles which include averages of colors of the colors on the portion of the canvas. By way of example, a canvas includes a red square on a white background. Upon selection of an edge of the square including 50% selection of the white background portion and 50% selection of the red portion, resulting circles are created with a blend of 50% red and 50% white, resulting in a desaturated red or tinted red which is the average of the red and white selected by the auto-circles tool. In another example, a canvas includes a square including a rainbow gradient on a black background. Upon selection of an edge of the square including 50% selection of the black background portion and 50% selection of the rainbow gradient portion, resulting circles are created with a blend of 50% of the black color and 50% of the rainbow gradient, resulting in a shaded rainbow gradient color which consist of the average of the rainbow gradient portion and black background portion. In one embodiment, the auto-circles tool creates three circles, with each of the circles overlapping the other two circles. Each of the circles has a defined perimeter; in other words, the perimeters of the circles are not blurred. Each circle is filled with a different color than the other circles. In one embodiment, the colors of the circles are determined by determining the colors in the selected canvas elements, assigning a color code or color value to each of the colors, such as an HTML color code, a Hex color code, an RGB value, and/or an HSL value, determining the number of pixels associated with each color in the canvas elements, averaging the color codes or color values based on the number of pixels associated with each color in the canvas elements, and determining an average color code or color value. The circles are then filled with a color representing the average color code or average color value.

The blur tool enables users to select elements on a canvas and apply a blur effect to the selected elements, creating a distortion among the selected elements. In one embodiment, the severity of the blur effect is determined based on how long a user remains selecting a canvas element (e.g., the longer a user selects an element, the greater the distortion). In one embodiment, the platform enables users to adjust the size of the blur effect. Advantageously, the present invention provides for the blurring tool to edit the image being blurred such that the blurred portions are on the same layer of the image. In other words, in one embodiment, the blurred image is not created on a separate layer.

The merge tool enables users to select two or more layers on a canvas and combine them, creating a single layer. Advantageously, the merge tool enables users to create works of art of higher quality, as manually merging layers is time consuming and is potentially subject to user metamerism issues.

Once a user has completed a piece of art, the Publish GUI button enables the user to publish the piece of art to the platform. Upon publishing to the platform, all users of the platform are able to view the piece of art, comment on the piece of art, apply a user rating to the piece of art, and/or watch a replay of how the piece of art was created on a stroke-by-stroke basis. The Clear GUI button clears all elements from a canvas, resulting in a blank canvas, as if a user had created a brand new session.

Furthermore, each of the individual elements present within a canvas, such as a color selector, a brush toolset, and/or a user chat-box, are operable for re-location on the GUI via user interaction. In one embodiment, the platform is operable to provide a plurality of GUI layouts to users, where each of the plurality of GUI layouts locates each element associated with the Canvas GUI in a different location from a previous GUI layout.

Moreover, the Canvas GUI incorporates a plurality of user communication tools. The plurality of user communication tools enables users collaborating on a work of art to discuss the current work and/or any topics of their choice, without requiring users to leave the Canvas GUI. Whereas traditional platforms would require a completely separate communication tool to be used for efficient collaboration or require users to save their progress and leave a session to join a communication-specific session, the platform of the present invention incorporates communication features directly into the Canvas GUIs and/or spaces within the platform.

These communication tools enable both users collaborating on a work of art and users spectating and/or viewing the work in-progress to communicate with one another in a single location. This further provides notice to the session owner(s) and collaborators of those users who are actively collaborating, via a collaboration list, and users that are solely spectating and/or viewing the work in-progress, via a spectator list. In addition, the platform provides all users, whether the user is collaboration, spectating and/or viewing, with the ability to communicate together, through collaborator-to-collaborator communication, collaborator-to-spectator communication, spectator-to-spectator communication, and/or any combination thereof.

The Canvas GUI is further operable to save completed art sessions as video recordings, enabling users to watch the creation of a specific work of art from creation to completion. The collaborative art and communication platform is operable to store session data corresponding to each artwork session, where the session data includes, but is not limited to, a title, a theme, a style, a start time, a finish time, a multiplicity of session users, color data, total number of canvas layers, canvas layer data, a post-completion edit indicator, and/or a user contribution value corresponding to each of the multiplicity of session users.

In addition, the platform enables users to combine a multiplicity of canvases into a single canvas. This enables multiple users to split a single work of art into smaller, separate works of art. The platform enables users collaborating on a work of art to view the canvases of the collaborating users in real-time or near-real-time. Moreover, the platform is operable to indicate the cursor movements of other users, in real-time or near-real-time, via a GUI indicator. Advantageously, this enables users to easily split more complicated works of art into smaller works, enabling users to combine canvases prior to and/or after a work of art is designated as "complete."

The Canvas GUI further provides users with a plurality of tools and/or functionalities relating to art creation, manipulation, and/or editing. In one embodiment, the platform incorporates artificial intelligence (AI), natural language processing (NLP), and/or machine learning (ML) techniques and technologies into the plurality of tools and/or functionalities.

One application of AI, NLP, and/or ML is an asset detection function. The asset detection function is operable to detect and/or identify individual assets within a work of art. For example, in an image with a person, a bird, and several trees, the platform is operable to detect and/or identify each of these elements individually, without requiring users to manually select and/or identify these elements. Advantageously, the asset detection function enables users to separate individual elements from a canvas and add new features to these individual elements, without impacting any other elements present on a canvas.

Figure 7A:
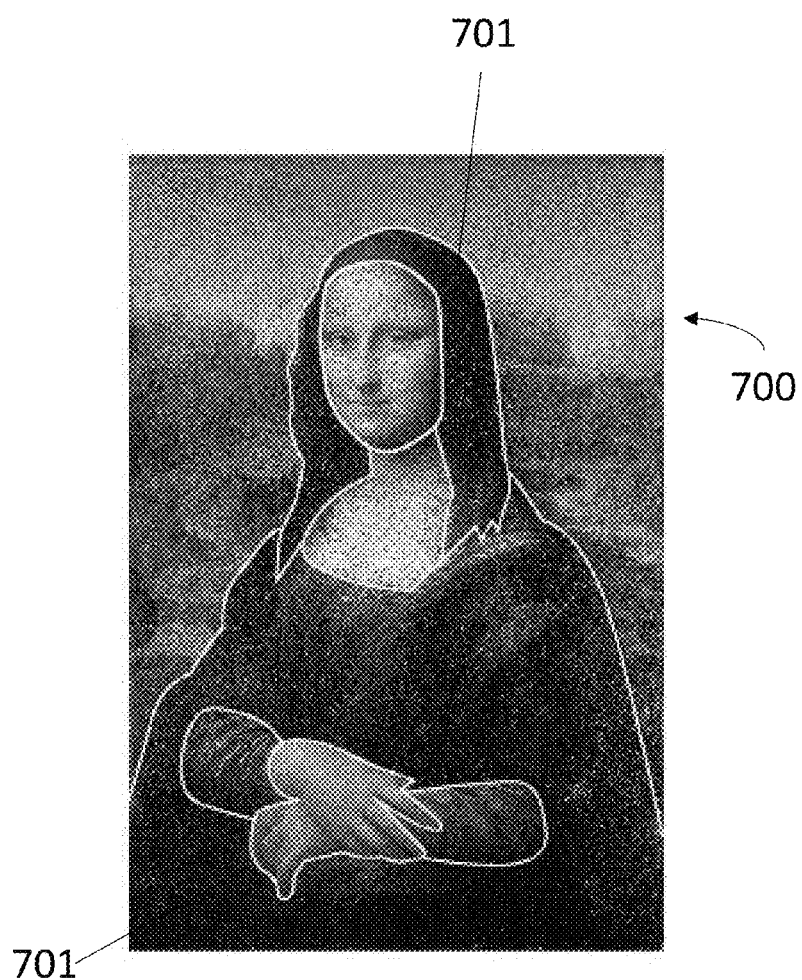
FIG. 7A illustrates an image where an asset detection function has been performed to highlight portions of the image according to one embodiment of the present invention.

FIG. 7A illustrates an image 700 where an asset detection function has been performed to highlight portions of the image 701 according to one embodiment of the present invention. Asset detection is performed by the collaborative art and communication's AI, NLP, and/or ML component. Once used, the asset detection function has been enabled and/or used, the Canvas GUI is operable to highlight individual components that make up a work of art. For example, where a multiplicity of users has created a portrait of a human, the asset detection function is operable to highlight individual body parts of the human including, but not limited to, a face, facial hair, hair, eyes, eyelids, eyelashes, nose, mouth, cheeks, lips, ears, neck, a body outline, arms, legs, feet, hands, fingers, and/or toes. Once enabled and/or used, the asset detection function is operable to display identified components to each of the multiplicity of users working on the portrait. This display is performed in real-time or near-real-time.

Figure 7B:
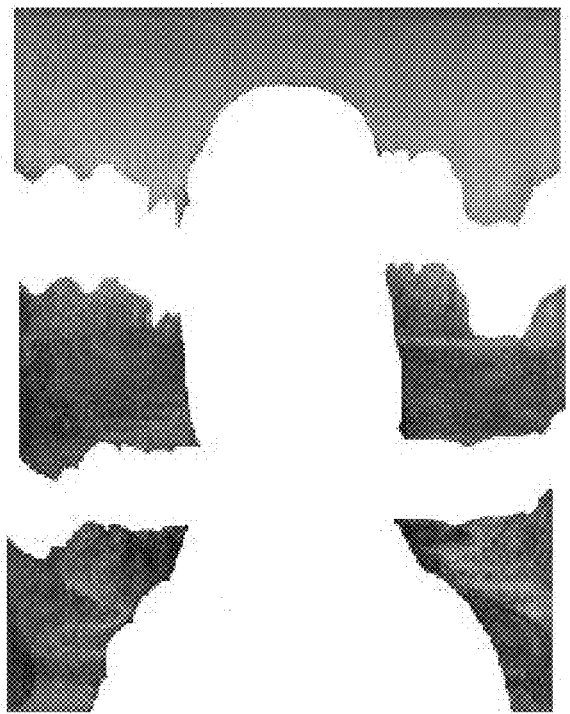
FIG. 7B illustrates an image with removed assets according to one embodiment of the present invention.

FIG. 7B illustrates an image with removed assets 900 according to one embodiment of the present invention. Once an asset detection function has been enabled and/or used, the collaborative art and communication platform is operable to separate identified assets from a work of art. For example, where the work of art is a portrait of a human, the asset detection function is operable to indicate and/or highlight a plurality of human body components. When the asset detection function has identified and/or highlighted all of the available human body components, the collaborative art and communication platform enables users remove the identified assets from the work of art. These identified assets are placed on a new canvas, corresponding to the current art creation session. In one embodiment, the collaborative art and communication platform enables users to drag-and-drop identified assets onto a new canvas. In another embodiment, the collaborative art and communication platform automatically removes identified assets and places the identified assets on a new canvas.

Figure 7C:
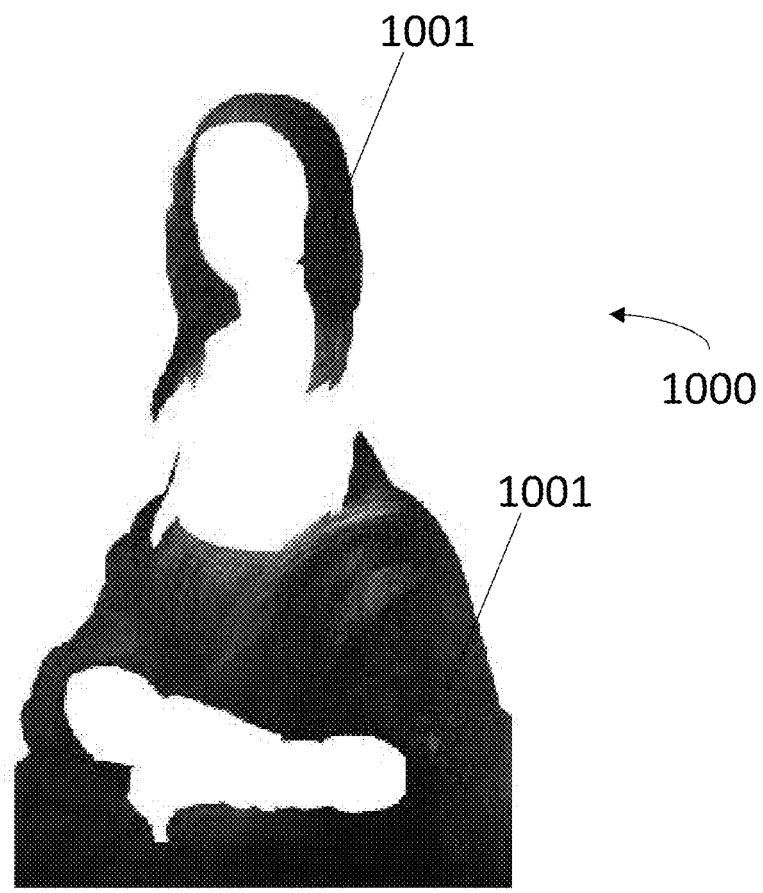
FIG. 7C illustrates a set of removed assets from an image according to one embodiment of the present invention.

FIG. 7C illustrates a set of removed assets 1000 from an image according to one embodiment of the present invention. For example, where the work of art is a portrait of a human, the asset detection function is operable to remove assets 1001 from the portrait. Removed assets are placed on a new canvas using the Canvas GUI. The collaborative art and communication platform is further operable to perform a second round of asset detection, enabling the platform to separate secondary background assets from secondary foreground assets.

Figure 7D:
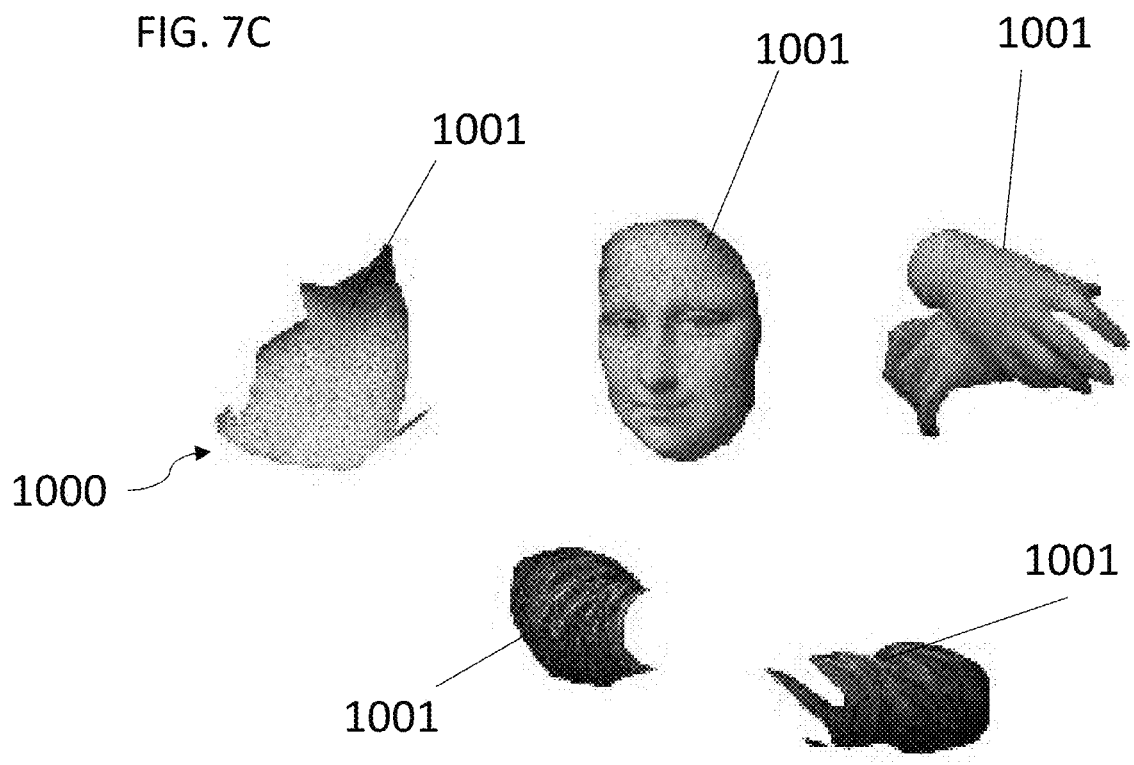
FIG. 7D illustrates a set of removed assets from an image according to another embodiment of the present invention.

FIG. 7D illustrates a set of removed assets 1000 from an image according to another embodiment of the present invention. In addition to removing individual assets 1001 from a canvas, the platform is further operable to separate a removed asset into a plurality of assets. For example, where the asset is a portrait of a human, when a user removes the human from one canvas to another, the platform enables the user to further separate the human into a plurality of assets, such as arms, legs, hands, feet, etc. This functionality enables users to not only make edits and/or additions to individual assets, without disturbing and/or editing other assets, but to split an asset into a plurality of assets in order to edit finer details present on the asset.

Figure 8A:
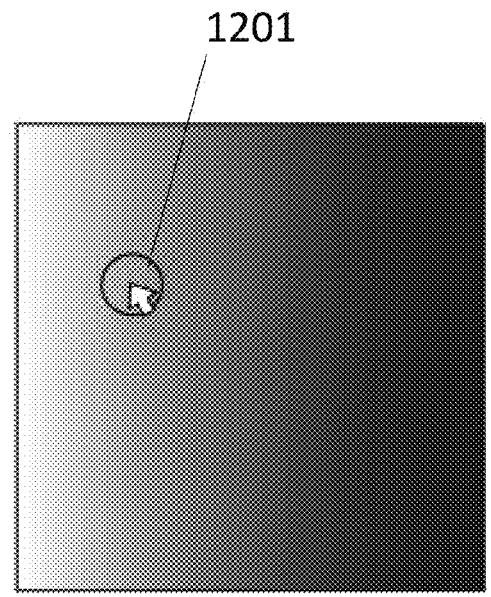
FIG. 8A illustrates an area picker using a five-pixel radius according to one embodiment of the present invention.
Figure 8C:
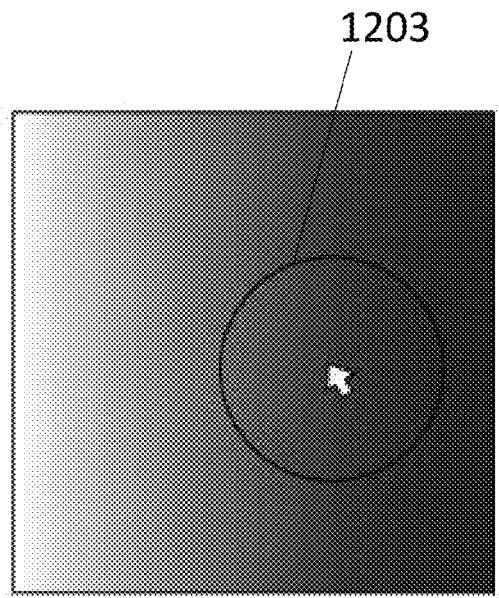
FIG. 8C illustrates an area picker using a twenty-pixel radius according to one embodiment of the present invention.
Figure 8B:
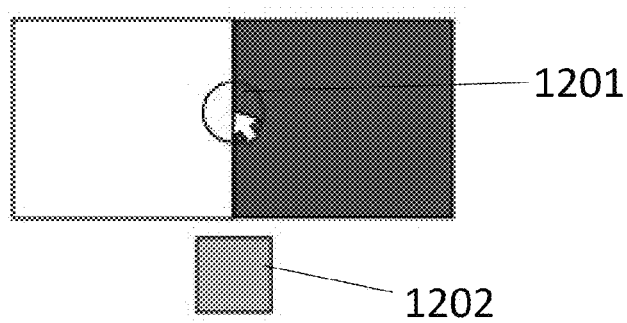
FIG. 8B illustrates an area picker using a five-pixel radius according to another embodiment of the present invention.

FIGS. 8A & 8B illustrate an area picker using a five-pixel radius 1201 according to one embodiment of the present invention. Advantageously, the area picker using a five-pixel radius 1201 enables users to easily blend fine details on a canvas. The lower box 1202 in FIGS. 8A & 8B represents the blend of the colors selected by the area picker tool. This enables users to edit any detail present on a canvas, no matter the size.

Figure 8D:
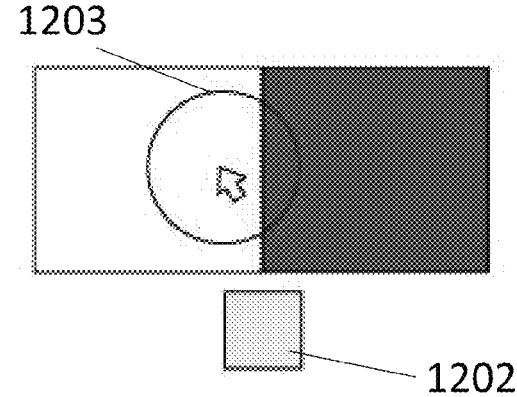
FIG. 8D illustrates an area picker using a twenty-pixel radius according to one embodiment of the present invention.

FIGS. 8C & 8D illustrate an area picker using a twenty-pixel radius 1203 according to one embodiment of the present invention. Advantageously, providing a twenty-pixel radius for the area picker enables users to select a large area of a canvas and select a color representing the average of all colors within the twenty-pixel radius. Whereas a five-pixel radius is more suited toward selecting a color between elements that are small in pixel size, providing a twenty-pixel radius for the area picker enables users to quickly select colors for large elements present on a canvas. The lower box 1202 in FIGS. 8C & 8D represents the blend of the colors selected by the area picker tool.

Figure 8E:
FIG. 8E illustrates an area picker according to one embodiment of the present invention.

FIG. 8E illustrates a GUI including an area picker 1204 according to one embodiment of the present invention. For example, where a red canvas element and a blue canvas element overlap and/or touch, the platform is operable to detect the individual color values corresponding to each of the canvas elements and seamlessly blend them together, resulting in a new canvas element with a color between the first canvas element and the second canvas element. In the aforementioned example, the area picker is operable to produce a new canvas element colored using a mix of the red and blue from the original canvas elements, such as purple and/or brown.

In addition to enabling users to edit fine details present on a canvas, the area picker functionality is automatic, requiring no user interaction. Traditional platforms require users to select a single color, using the user's own vision as a guide, that best represents the blend of colors the user is currently working with. This results in a work of art with improperly blended elements or color mismatch issues where a user has selected an inappropriate color to mix with. These issues often require users to reset and/or delete large amounts of work as the user identifies the proper color to mix and/or blend with. The platform of the present invention solves these issues through the use of the area picker, removing the possibility of user error and reducing the overall amount of time necessary to complete a given work of art, as the user no longer has to constantly reset and/or delete additions that do not blend and/or mix.

The collaborative art and communication platform further includes a time-based coloring and auto-line detection function. Time-based coloring enables a user to click and hold the cursor over an area on a canvas where the platform then begins to fill the selected area from the point clicked on the canvas and outwards. Thus, the platform enables users to quickly fill a desired canvas space with a single and/or multiple colors at once, without requiring the user to continuously interact with the canvas.

Figure 9A:
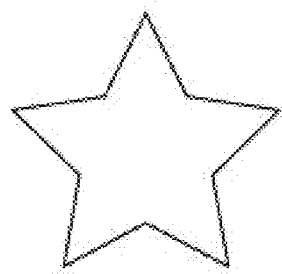
FIG. 9A illustrates a time-based coloring and auto-line detection process according to one embodiment of the present invention.

FIG. 9A illustrates a time-based coloring and auto-line detection process 1300 according to one embodiment of the present invention. Once a user has initiated the time-based coloring and auto-line detection process, the platform first requires that a user select a point on the canvas to begin coloring. If a user has not selected a point on the canvas, the canvas will remain blank or in its current state, without any additional coloring.

Figure 9B:
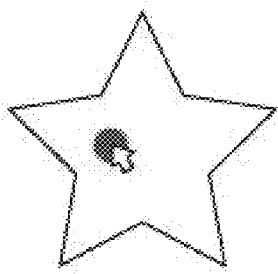
FIG. 9B illustrates a time-based coloring and auto-line detection process where one second has elapsed since a user initiated the process according to one embodiment of the present invention.

FIG. 9B illustrates a time-based coloring and auto-line detection process 1300 where one second has elapsed since a user initiated the process according to one embodiment of the present invention. Once a user has initiated the time-based coloring and auto-line detection process, and selected a point on the canvas to begin coloring, the platform begins adding a designated color at the selected point. The size (e.g., pixel radius) of the additions by the time-based color and auto-line detection process is determined based on how long a user holds a cursor over the selected point. For example, where a user holds the cursor over the selected point for only a single second, a small addition is made to the canvas by the time-based coloring and auto-line detection process.

Figure 9C:
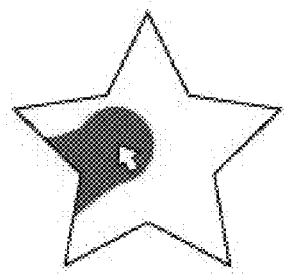
FIG. 9C illustrates a time-based coloring and auto-line detection process where two seconds have elapsed since a user initiated the process according to one embodiment of the present invention.

FIG. 9C illustrates a time-based coloring and auto-line detection process 1300 where two seconds have elapsed since a user initiated the process according to one embodiment of the present invention.

Figure 9D:
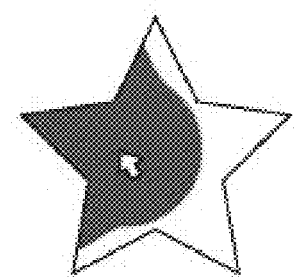
FIG. 9D illustrates a time-based coloring and auto-line detection process where three seconds have elapsed since a user initiated the process according to one embodiment of the present invention.

FIG. 9D illustrates a time-based coloring and auto-line detection process 1300 where three seconds have elapsed since a user initiated the process according to one embodiment of the present invention.

Figure 9E:
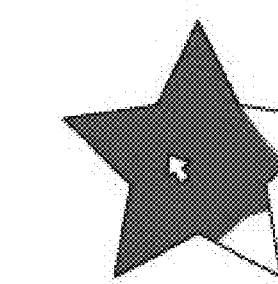
FIG. 9E illustrates a time-based coloring and auto-line detection process where four seconds have elapsed since a user initiated the process according to one embodiment of the present invention.

FIG. 9E illustrates a time-based coloring and auto-line detection process 1300 where four seconds have elapsed since a user initiated the process according to one embodiment of the present invention.

Figure 9F:
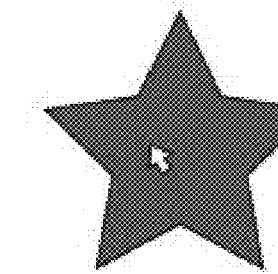
FIG. 9F illustrates a time-based coloring and auto-line detection process where five seconds have elapsed since a user initiated the process according to one embodiment of the present invention.

FIG. 9F illustrates a time-based coloring and auto-line detection process 1300 where five seconds have elapsed since a user initiated the process according to one embodiment of the present invention.

In one embodiment, where the platform detects that a particular object is completely filled with a specified color, using the time-based coloring and auto-line detection process, the platform ceases to insert the specified color into the object. Advantageously, this enables users to color entire objects without worrying about spilling color over onto another object or drawing over another portion of the canvas.

Each of the aforementioned functionalities and/or techniques is displayed on the Canvas GUI, in real-time or near-real-time, enabling users to view the actions and/or cursor movements of every user collaborating on that specific work of art. For example, where there are two users collaborating on a work of art, both users are able to see the respective cursor movements and/or actions of the other user, in real-time or near-real-time. This functionality is available even where the Canvas GUI contains multiple canvases.

However, not all works of art are able to be completed in a single session. To address this issue, where a user of the collaborative art and communication platform has previously begun a new session and ended the session before the work of art was complete, the platform enables users to continue from where the session previously ended. Advantageously, this enables users to quit and return to more complex and/or advanced works of art, without requiring users to finish every work of art in a single session.

Furthermore, the platform is operable to enable users to save any user sessions to be continued offline and/or while the user does not have access to the Internet. In one embodiment, the platform stores all user sessions as users modify and/or add to each session. When a user quits or leaves a session, and the user wants to work on the session while offline, the platform saves two versions of the session, a primary version, and a secondary version. The platform enables the user to continue work using the secondary version, with updates and/or modifications saved locally on the user's computing device while offline. The secondary version is preferably saved as a separate layer from the primary version. Once the user's device connects to the Internet and logs/signs into the platform, the separate layer representing the secondary version is uploaded, via the user's mobile computing device, to the collaborative art and communication platform where it is compared against the primary version. In one embodiment, the layer representing the secondary version is operable to be merged with the layer(s) representing the primary version of the session. Using the platform's AI and/or ML component, the platform is operable to identify changes made to the primary and secondary versions, present these changes to users via highlighting changed assets, and performing a color blending function based on color data present in the primary and secondary versions. The color blending function uses the platform's AI and/or ML component to analyze the color data corresponding to each version. The platform is operable to determine differences in color data and perform a blending function on the primary and secondary version, such that differences in color data are minimized and the resulting work of art is presented to the users as a merged work of art. In one embodiment, the number of stored sessions corresponds to the number of users currently active within the session.

The blending function is operable to create an area between two or more colors where the two or more colors gradually mix together, creating a smooth transition from a first color to a second color. The smooth transition from the first color to the second color preferably includes colors in between the first color and the second color in the color spectrum. In one embodiment, the blending function is performed using a combination of hue and saturation values corresponding to a specific asset and/or a specific layer of a work of art. The area surrounding the specific asset and/or the specific layer are analyzed by the platform to determine corresponding hue and saturation levels for the surrounding asset(s) and/or the surrounding layer(s). Once the surrounding hue and saturation levels are determined, the platform's AI and/or ML component is operable to determine a set of optimal hue and saturation levels to apply to the specific asset and/or specific layer. In one embodiment, the blending function is performed using only a hue value and/or set of hue values. In another embodiment, the blending function is performed using only a saturation value and/or set of saturation values.

In one embodiment, the collaborative art and communication platform enables users to disable individual AI and/or ML components, as well as disable all of the available AI and/or ML components present within the platform.

In addition to creating new sessions on the platform, the platform further enables users to join sessions in-progress, those created by other users. The platform provides users with functionality enabling the users to search and/or sort the currently in-progress sessions on the platform. In one embodiment, searching and/or sorting is performed using terms including, but not limited to, a session title, a session creator, a session style, a session skill level, a session completion percentage, a session purpose, a public session indicator, a private session indicator, and/or a session streaming indicator. Thus, users are able to quickly identify and/or join sessions that best match the interest of the user.

Figure 10:
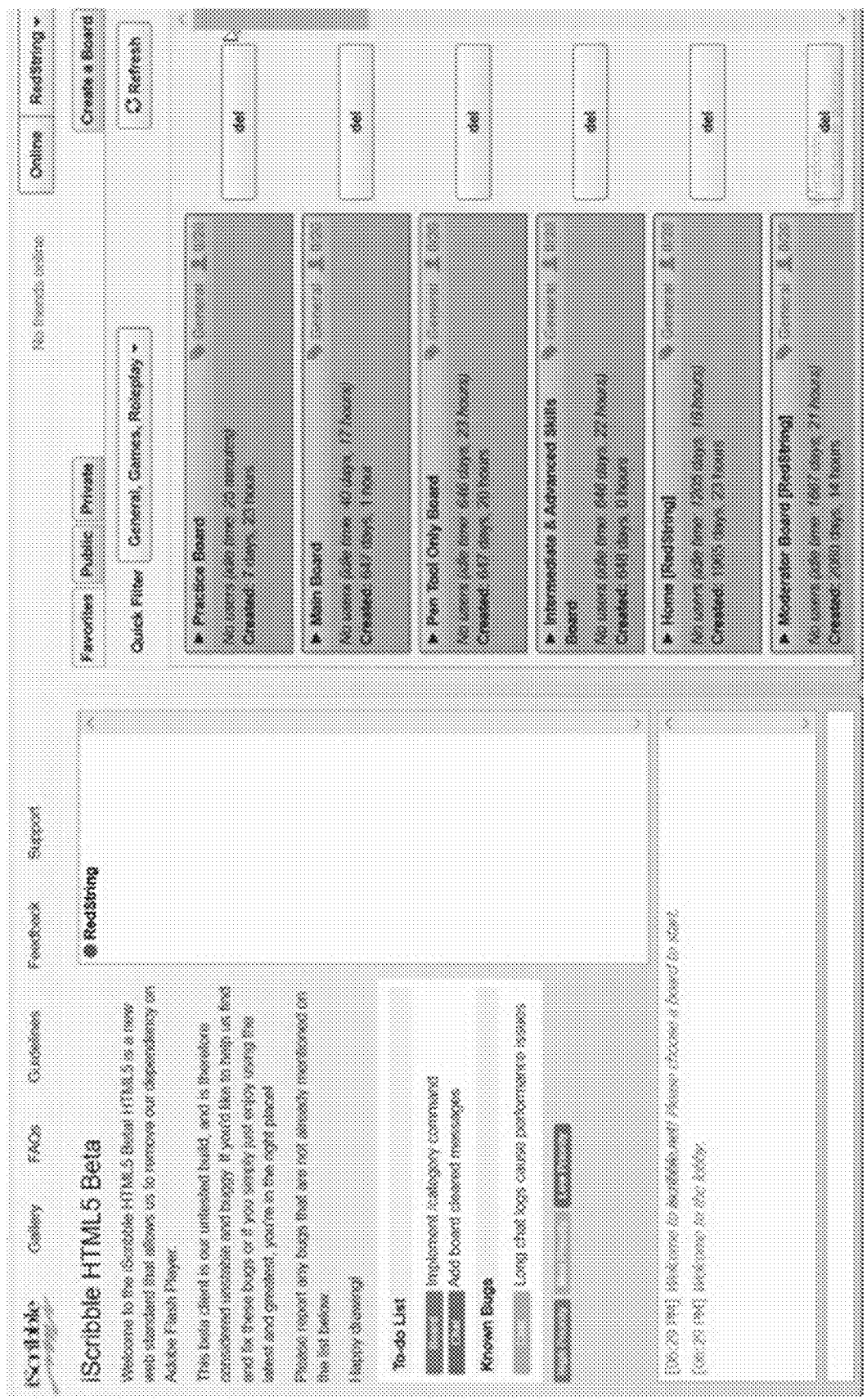
FIG. 10 illustrates a Session Selection GUI according to one embodiment of the present invention.

FIG. 10 illustrates a Session Selection GUI 1400 according to one embodiment of the present invention. The platform provides users with a searchable and/or sortable list of every active session on the platform. In addition, the platform is operable to provide users with a unique visualization indicating whether a particular session has been designated a public session or a private session. In one embodiment, public sessions are designated using a first session highlight color and private sessions are designated using a second session highlight color, where the first session highlight color and the second session highlight color are not the same color. This provides users with a quick, visual identification of whether a particular session is open to the public or is private, requiring that a user first receive an invite to join the session.

The platform is further operable to enable users to invite additional users to a continued session where the additional users previously contributed to the work of art in the continued session. In one embodiment, the platform automatically invites the additional users. In another embodiment, the platform provides users with an Invite GUI, enabling users to select additional users to invite to the continued session.

In one embodiment, the platform enables users who decline an invite to continue work on a previous session to restrict editing corresponding to specific aspects of the work of art a user has previously contributed to.

Furthermore, the platform enables users to join sessions in-progress where the user desires only to view the work of other artists (i.e., live streaming). Where a session owner has enabled streaming and/or viewing for the session, the platform enables a multiplicity of users to join the session. In addition, the session owner is proved with a link and/or Uniform Resource Locator (URL) specific to the streaming session, where the user is able to share the link and/or the URL with other users. Advantageously, by incorporating streaming functionality, the platform enables artists to reach a wider audience, increasing the reach and exposure for artists of the platform.

As previously mentioned, the platform of the present invention provides users with a plurality of options for joining sessions and collaborating with other users on works of art, whether users are joining brand new sessions or joining existing sessions (e.g., sessions in-progress). Thus, the collaboration process is operable to take on a plurality of forms, as users join sessions at various stages of an artwork's completion.

Figure 11:
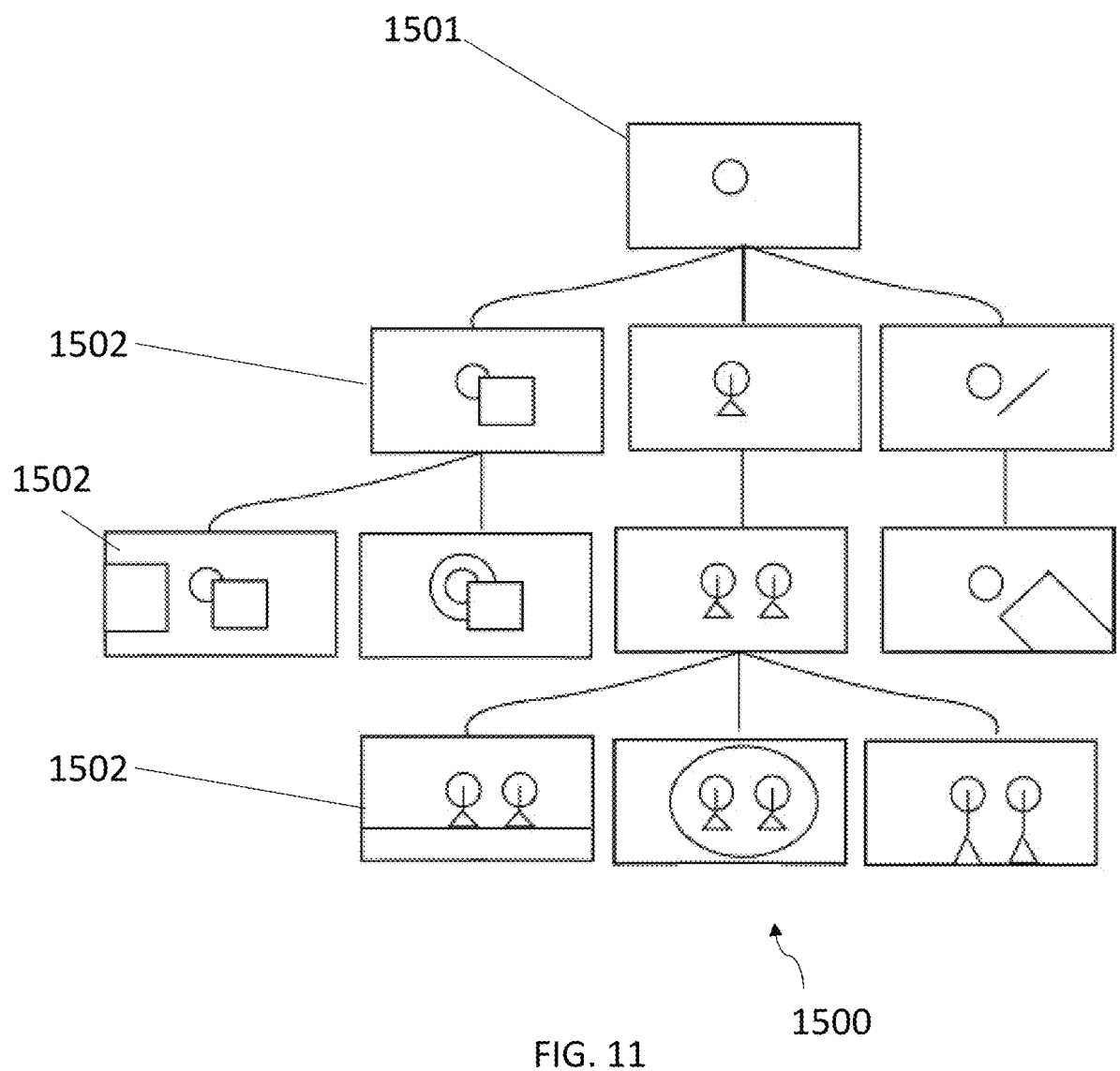
FIG. 11 illustrates a Collaboration Tree diagram according to one embodiment of the present invention.

FIG. 11 illustrates a Collaboration Tree diagram 1500 according to one embodiment of the present invention. The Collaboration Tree diagram illustrates the collaboration process employed by the platform for remote collaboration. First, a user creates a first session 1501 which includes a canvas including at least one layer and at least one element on the at least one layer. If remote collaboration is enabled, the first session is then operable to be edited by one or more other users. Advantageously, there is no requirement that the one or more other users be connected with the user who created the first session. Rather, the first session becomes available for remote collaboration and any user on the platform can edit the first session. In one embodiment, the one or more other users edit the at least one element on the at least one layer. The edits are operable to be additions or subtractions to the at least one element on the at least one layer. Alternatively, the one or more other users add an additional layer to the at least one layer and create additional elements on the additional layer. The Collaboration Tree shows a history of all edits and subsequent sessions 1502 based on the first session in a visual tree format, with each image on the Collaboration Tree preferably being static and fixed once completed. In one embodiment, a username is associated the first session and the subsequent sessions. Notably, each edited session is published, and subsequent edits are operable to be made to the edited session by other users or the same user. Edits are operable to made simultaneously to the first session or subsequent sessions such that a variety of different users build upon the same preceding session, and a variety of different subsequent users are operable to build upon those subsequent sessions. Advantageously, the Collaboration Tree diagram is operable to be used to show how a work of art was created through the collaboration of different users through multiple sessions.

In one embodiment, the platform includes a stroke-based engine for recording every stroke and/or cursor movement on a canvas to be saved and/or stored and subsequently replayed. The result in this embodiment is the ability for a user to watch, from beginning to end, how a particular work of art was created. In one embodiment, a work of art does not have to be designated as "complete" before the Collaboration Tree or the replay of creation via the stroke-based engine is available for viewing. In one embodiment, the platform enables users to view both completed works and works of art in-progress using the replay functionality. Where a work of art is in-progress, the platform enables users to view a replay of the work of art's creation up to its current form, as the work of art has not been completed yet.

Figure 12:
FIG. 12 illustrates a Replay GUI according to one embodiment of the present invention.

FIG. 12 illustrates a Replay GUI 1600 according to one embodiment of the present invention. The Replay GUI provides a video or time lapse that is advantageous for viewing collaboration of multiple users in the same sessions. The Replay GUI is operable to indicate a start date, an end date, a description, an artwork rating, and/or a replay indicator. The start date and end date correspond to the dates at which the work of art was began and complete, respectively. The description provides users with a description about the specific piece of art they are currently viewing. In one embodiment, the artwork rating is an average of all the ratings the piece of art has received from all users of the platform. In one embodiment, the artwork rating is a weighted average of all the ratings the piece of art has received from all users, where a greater weight and/or value is given to the ratings of users who have contributed to the platform versus those users who only spectate. The replay indicator indicates whether or not the ability to replay the creation of the piece of art is enabled or disabled.

In addition to enabling the ability to replay completed works of art in their entirety, the platform is operable to assess completed and in-progress works of art. This assessment is performed using AI, ML, NLP, and/or any combination thereof. This assessment serves as a means to quantify and/or qualify the attributes of each individual work of art on the platform. Measurable attributes include, but are not limited to, stroke quality, line quality, line width, dot patterns, brushstroke patterns, symmetrical attributes, color blending, color contrast, subject matter, clarity of subject matter, geometric composition, fragmentation, skill level, style quality, a time-to-completion, a collaborator count corresponding to the number of collaborators that worked on a particular work of art, and/or a color variety value corresponding to the number of colors used to create a work of art. For example, certain types of painting styles or art movements are associated with certain attributes, and the AI, ML, NLP, and/or any other methods for learning and classifying art are operable to indicate one or more styles of art the work of art most closely resembles. Styles of art include, by way of example and not limitation, Abstract Expressionism, Art Deco, Bauhaus, colour-field painting, conceptual art, Constructivism, Cubism, Dada, De Stijl, Der Blaue Reiter, Deutscher Werkbund, Die Brücke, The Eight, Expressionism, Fauvism, Fluxus, Futurism, Group f.64, Harlem Renaissance, Metaphysical painting, Minimalism, Neo-Expressionism, New Objectivity, Op art, Orphism, performance art, Photo-realism, Photo Secession, Pop art, Precisionism, Purism, Social Realism, street photography, Suprematism, Surrealism, Tachism, and/or Vorticism. In one embodiment, several styles are represented visually as a continuum, in quadrants, or in any other visual way known in the art, and the style or styles which the work of art most closely resembles is indicated on the visual representation as a shape such as a dot, a triangle, or any other polygon covering the areas of the visual representation associated with the styles that attributes of the art work most closely resembles. In one embodiment, a visual representation is provided for each attribute and an indication of where the work of art is classified for that attribute is provided. Numerical values are operable to be provided for each attribute and/or each style for a work of art, such as from 1 to 100. In another embodiment, the work of art is operable to be compared to a specific work of art generated on the platform or separate from the platform, and is operable to be given one or more scores for similarity to an art style or to any of the attributed above.

In addition to the previously mentioned session options, the platform is further operable to provide sessions that focus specifically on tutorials, teacher-student lessons, and one-on-one training.

Tutorials enable users to view a multiplicity of recorded videos of completed works of art on the platform, from the work's inception to its completion. This provides a space for artists of all skill levels to learn new techniques and/or hone their own set of skills using videos specifically designed to increase an artist's capabilities. In one embodiment, the recorded videos of completed works of art includes those that have designated a replay indicator as "enabled," wherein each of the recorded videos includes a plurality of text overlays, offering an explanation as to what the creator(s) were imagining at inception, why the creator(s) chose to use certain canvas features over others, and/or where the creator(s) drew inspiration from. By including text overlays with the aforementioned explanations, the recorded videos of completed works of art are operable to offer a detailed breakdown for every stroke and/or cursor movement. In one embodiment, text overlays are replaced with a voice recording, where the voice recording includes the same instructional information as the text overlays. In one embodiment, both text overlays and voice recordings are present within the recorded videos of completed works of art.

Moreover, the platform is operable to recommend specific tutorials to users using the aforementioned assessment and/or assessment score functionality. Thus, users of the platform are able to use tutorials to work on particular styles, techniques, subjects, themes, and/or combinations thereof and improve the user's artistic ability via the platform's recommended tutorials.

Teacher-student lessons are implemented via a Classroom GUI that supports a multiplicity of users, working simultaneously at the direction of at least one teacher. The Classroom GUI enables users to view both their own progress, via a Student GUI, as well as the progress of at least one teacher, via a Teacher GUI. Thus, the platform provides users with a real-time or near-real-time setting where a multiplicity of users receives artistic instruction by a professional and/or a user designated as a teacher. The Classroom GUI is operable to offer educational lessons that would normally only be available via in-person classes to all users of the platform in a virtual setting. The student-facing Classroom GUI is operable to be accessed by the teacher such that a teacher is operable to edit a canvas of a student, either directly on the same layer or in a separate layer. In one embodiment, a correctional layer is utilized by the teacher to provide input on the canvas of the student.

In addition, the Classroom GUI further enables users participating in a class to request a one-on-one meeting and/or session with the teacher of the class. This enables users who desire additional instruction, outside of the standard Classroom GUI. In addition, the Classroom GUI enables users to request a one-on-one session with other users attending the class.

One-on-one training sessions enable users of the platform to receive teaching instruction from another user in via a One-on-One GUI. The One-on-One GUI provides corresponding teacher/student views, enabling participants to see, in real-time or near-real-time, the actions of the other user. The platform enables users to increase their individual skill levels in a setting specifically designed for art instruction. Where the classroom sessions focus on more general art instruction and techniques, one-on-one training sessions are personalized for instruction in a specific technique and/or style. The student-facing One-on-One GUI is operable to be accessed by the teacher such that a teacher is operable to edit the canvas of the student, either directly on the same layer or in a separate layer. In one embodiment, a correctional layer is utilized by the teacher to provide input on the canvas of the student.

Figure 13:
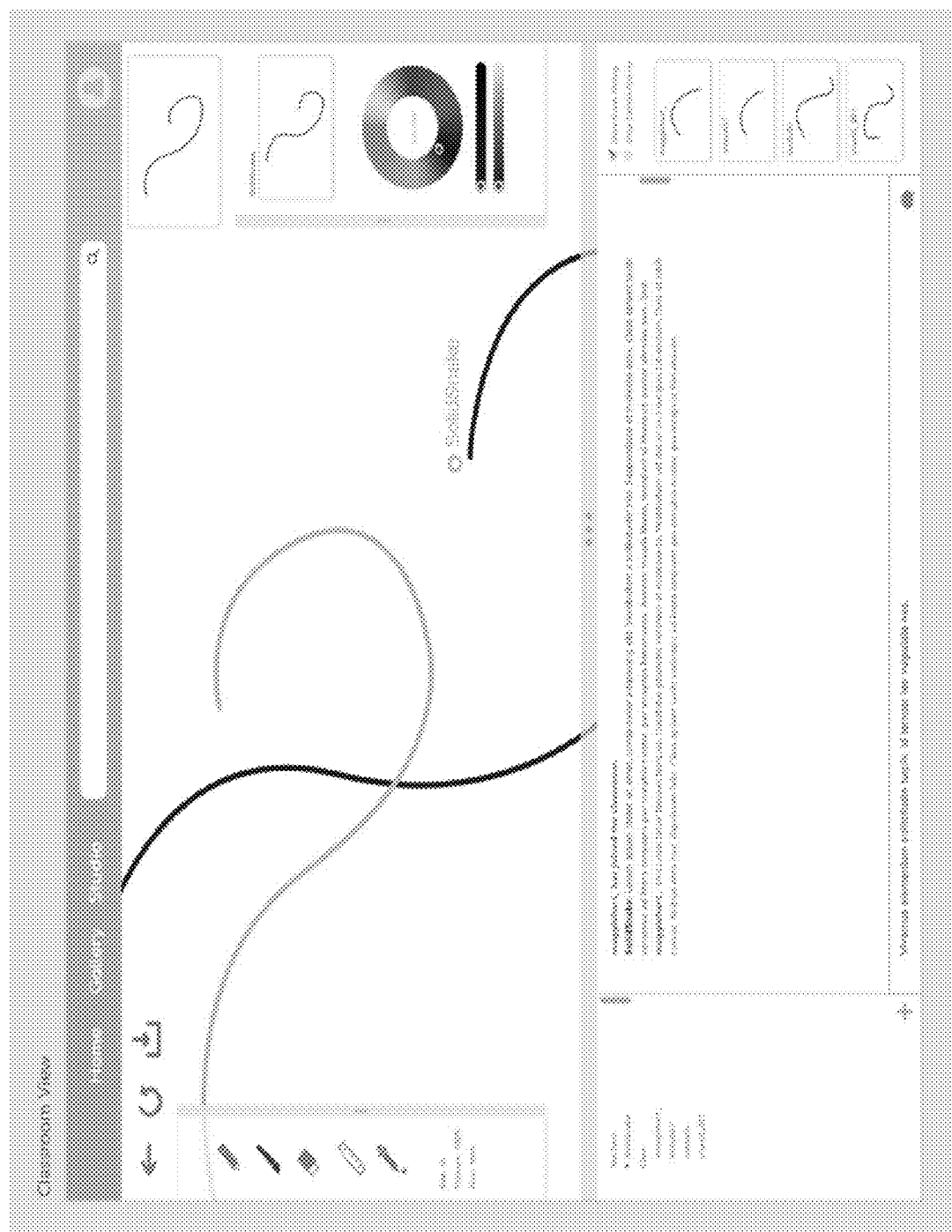
FIG. 13 illustrates a Classroom GUI according to one embodiment of the present invention.

FIG. 13 illustrates a Classroom GUI 1700 according to one embodiment of the present invention. The Classroom GUI 1700 includes a canvas including at least one element provided by an instructor on a first layer and at least one second layer operable to receive at least one element by at least one student. Preferably, in cases in which multiple students are present in the Classroom GUI 1700, each student is provided with a separate layer of the canvas. The Classroom GUI 1700 includes a depiction of the first layer separate from the canvas such that each student is operable to see the at least one element on the first layer separate from the canvas for clarity. This is helpful so that when the student begins to create the at least on element on the student layer, the student still has a clear unobstructed view of the at least one element created by the instructor. Additionally, the student is operable to view their student layer separate from the canvas so that the student can directly compare the at least one element in the student layer to the at least one element in the instructor layer. In one embodiment, the students are not operable to see the layers created by other students and only sees their student layer and the teacher layer. Alternatively, all layers are visible to all parties in the Classroom GUI 1700. In one embodiment, only the teacher is operable to view all student layers and the teacher layer on the canvas. The Classroom GUI 1700 also includes a chat room or messaging thread which is viewable to the instructor and the students participating in the classroom. The Classroom GUI 1700 is operable to include functionality included in the other GUIs which include a canvas, including but not limited to a pencil tool, a paintbrush tool, an eraser tool, a color picker tool, a color wheel, etc.

In one embodiment, the tutorials, teacher-student lessons, and one-on-one training of the present invention provide for assessing a work of art based on a model work of art or an instruction by a teacher. The platform is operable to produce an assessment score for this work of art. In one embodiment, the assessment score is presented as a value between one (1) and one hundred (100), where one is equal to a low assessment score and one-hundred is equal to a perfect assessment score. In another embodiment, the assessment score is presented as a grade ranging from "F" to "A," where an "F" indicates a poor assessment score and "A" indicates a perfect assessment score. The assessment score is generated by one or more artificial intelligence algorithms in one embodiment of the present invention. One or more artificial intelligence algorithms are operable to determine similarities or differences in colors, shapes, line thicknesses, textures, positions of elements on the canvas, and any other measurable attribute between the work of art and the model work of art or the work of art by the teacher. In another embodiment, the one or more artificial intelligence algorithms are operable to create individual scores for a variety of categories, including any measurable attribute of a work of art recited herein or known to one of ordinary skill in the art, and a composite assessment score is generated using these individual scores. In yet another embodiment, the one or more artificial intelligence algorithms are operable to suggest an assessment score or scores for a variety of categories, and the teacher is operable to adjust the scores manually. The one or more artificial intelligence algorithms are operable to be trained in this manner by receiving teacher feedback on the score and adjusting future scores accordingly. Additionally or alternatively, a teacher of the class is operable to create an assessment score and/or individual scores for a variety of categories manually. In one embodiment, the platform enables users to share the user's assessment score with other users. In one embodiment, the platform enables users to disable assessment features and/or functionalities.

In addition to the aforementioned collaborative art features and functionalities, the platform further supports a multiplicity of social networking and communication features. Advantageously, this provides artists with both a platform for art creation and coordination. Unlike traditional platforms, the platform of the present invention does not require that artists rely on third-party communication and coordination tools in order to collaborate with one another.

The collaborative art and communication platform is operable to provide additional communication functionalities including, but not limited to, a user feed, a user lobby, user-to-user chat, group user chat, user forums, a user marketplace, and/or a user streaming service.

The platform enables users to communicate with one another via direct user-to-user chat. User-to-user chat is available during sessions and outside of sessions, such as when users are searching the platforms various sessions and social networking features. User-to-user chat is further expanded via a group chat function, enabling a multiplicity of users to communicate with one another simultaneously, in real-time or near-real time. The platform enables users to create group chats based on a variety of options including, but not limited to, user friend lists, user group association, user interests, a user's preferred style, a user's preferred theme, favorite artists on the platform, favorite artists outside of the platform, and/or a random group chat. Advantageously, the platform integrates its AI, ML, and/or NLP techniques and technologies into the previously mentioned functionalities, enabling users to efficiently locate and communicate with other users. The AI, ML, and/or NLP techniques and technologies perform this matching using metrics including, but not limited to, user interests, user skill level, user platform contributions, user artwork ratings, user communities, user forums, and/or user platform communications.

The collaborative art and communication platform is further operable to provide a Forum GUI, enabling both users and the platform to post a multiplicity of forum posts corresponding to a multiplicity of forum. The Forum GUI provides a searchable and/or sortable GUI where users are able to join communities and/or communicate with other users with like and/or shared interests, without displaying these communications to every user of the platform.

In addition to the previously mentioned communication techniques, the platform is further operable to provide users with GUIs highlighting content that the platform has determined to be of interest to each user. This determination is made based on factors including, but not limited to, a list of user-specified interests, user platform activity data, and/or user platform communication data. In one embodiment, the list of user-specified interests is created using each user's profile. Thus, the platform is able to provide users with meaningful content based on the user's participation and/or communication on the platform.

Figure 14:
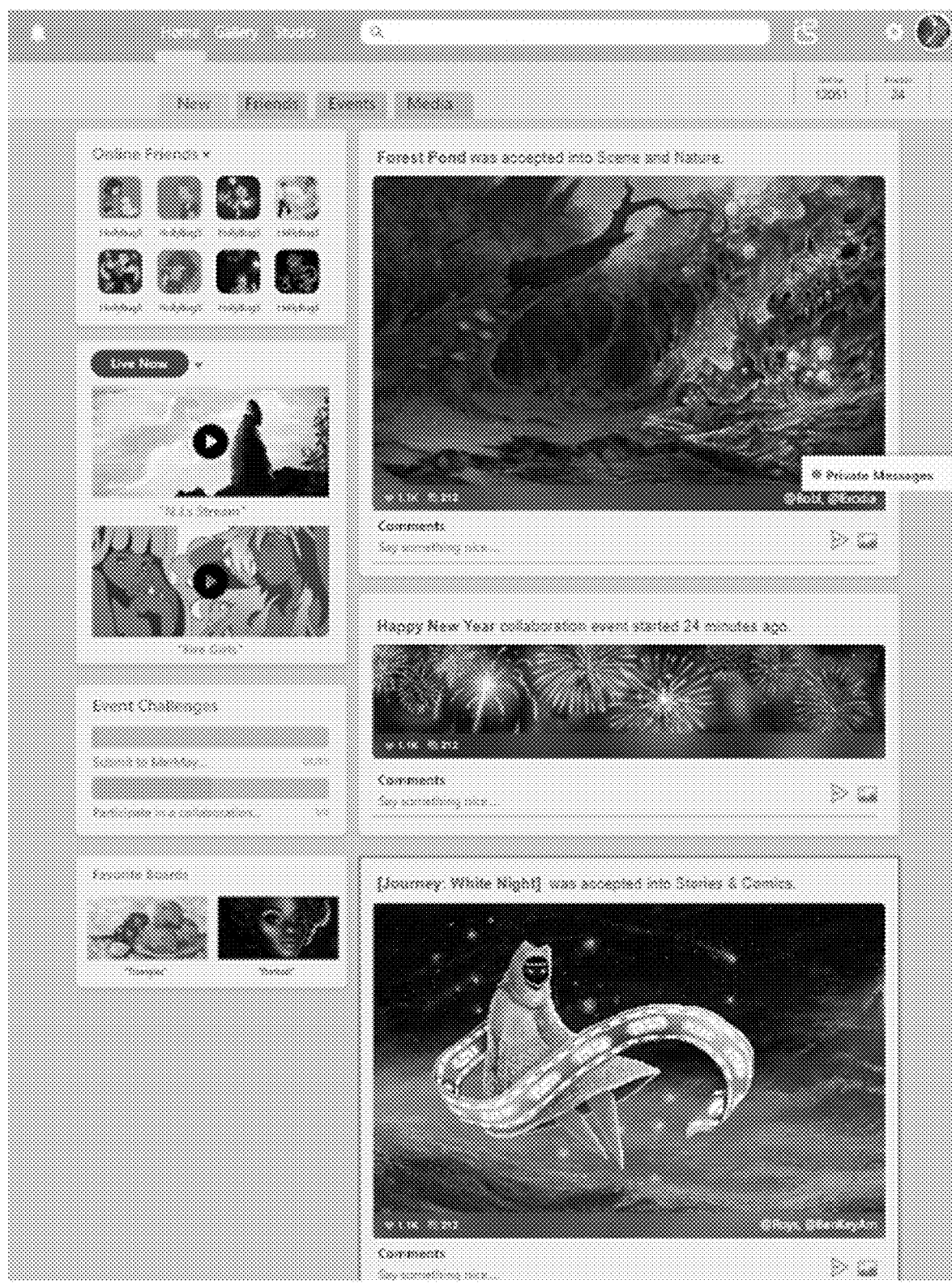
FIG. 14 illustrates User Feed GUI according to one embodiment of the present invention.

FIG. 14 illustrates User Feed GUI 1800 according to one embodiment of the present invention. The User Feed GUI 1800 is operable to display information including, but not limited to, news, friends, events, and/or media. In one embodiment, this information is split into separate "tabs," enabling a user to view only information relating to that particular tab. For example, a "Friends" tab includes information relating to all of a user's friends on the platform.

Through the User Feed GUI 1800, the platform is operable to inform users about which friends are currently active on the platform, which user streams are currently live and/or in-progress, which sessions a user has favorited, recent platform posts from all platform users and/or a user's friends, on-going events and the user's current progress in any on-going events the user is participating in, a total number of online users, a total number of online friends, and/or a message notification.

Advantageously, the platform is operable to collect and/or display a plurality of items determined to be of interest to a user in a single location using the User Feed GUI 1800. Thus, anytime a user wants to receive the latest information relating to new sessions, new posts, new events, new platform features, and/or new platform updates. Unlike traditional platforms, providing either a social media platform or an art platform, but not both, the platform of the present invention combines the features and functionalities of a collaborative art platform with those of a social media platform.

Figure 15:
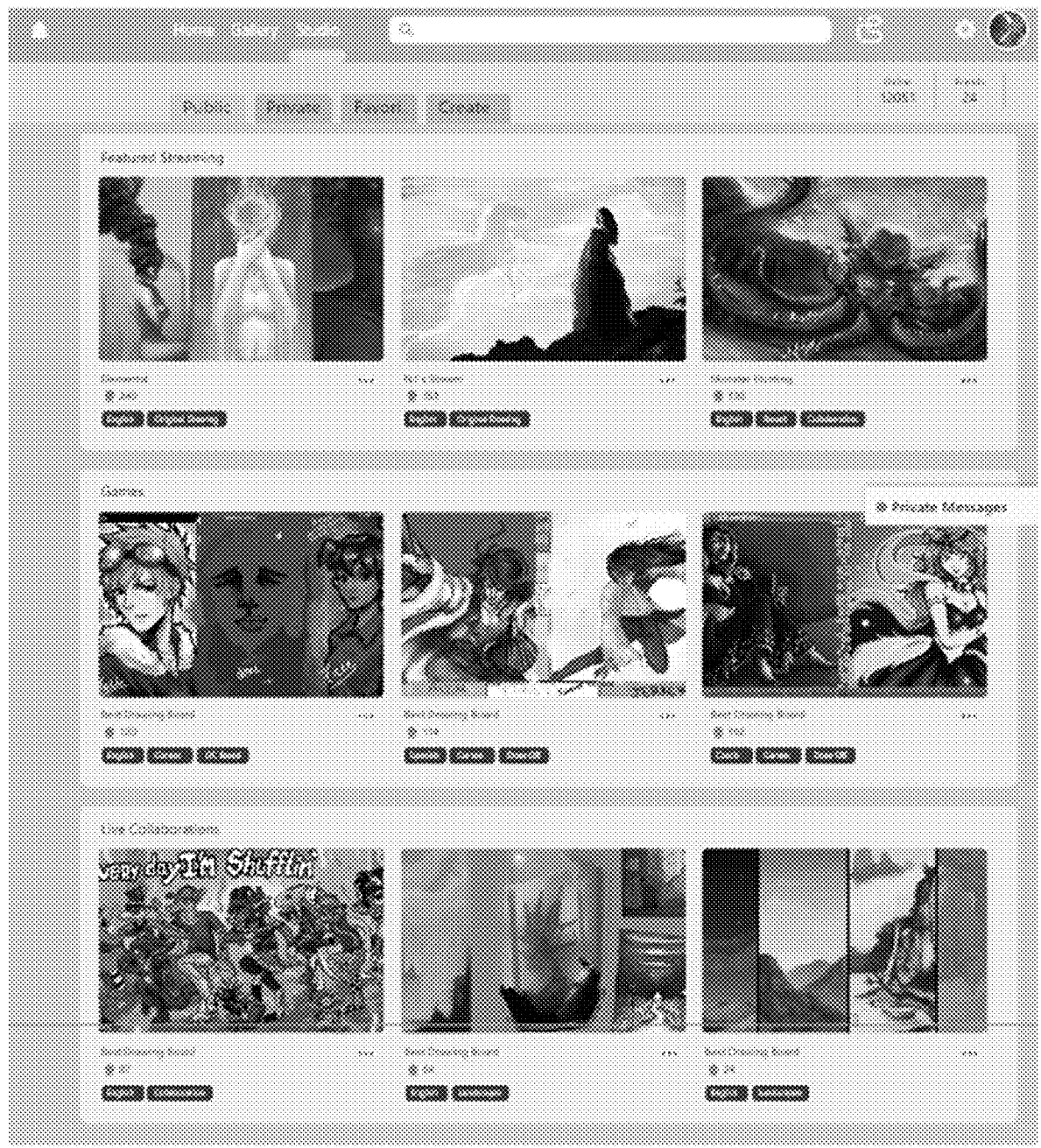
FIG. 15 illustrates a Lobby GUI according to one embodiment of the present invention.

FIG. 15 illustrates a Lobby GUI 1900 according to one embodiment of the present invention. The Lobby GUI 1900 serves as a hub for additional session options that have been designated as "currently popular" on the platform. Currently popular refers to a measurement of a sessions popularity, taking into account a plurality of attributes including, but not limited to, a collaborator count corresponding to the number of users currently collaborating in a session, a spectator count corresponding to the number of users currently spectating a session, whether or not any currently present collaborators have participated in a previous session designated as currently popular, an aggregation of all artwork ratings for every user currently collaborating in a session, and/or an average session rating corresponding to a session rating submitted for every currently-spectating user. In one embodiment, the Lobby GUI 1900 is updated in real-time or near-real-time, accurately reflecting what sessions are currently popular on the platform.

In addition, the Lobby GUI 1900 is operable to separate the various platform sessions into session groups, based on a session's category (e.g., Featured Streaming, Games, Live Collaboration, etc.). This enables users to quickly search through the Lobby GUI 1900 and quickly locate a session catering to the user's current platform interest and/or platform goals. In one embodiment, the Lobby GUI includes a set of scrollable session lists corresponding to a particular session category. For example, all of the "Nature" sessions are present within a separate scrollable list, all of the "Animal" sessions are present within another separate scrollable list, etc.

Figure 16:
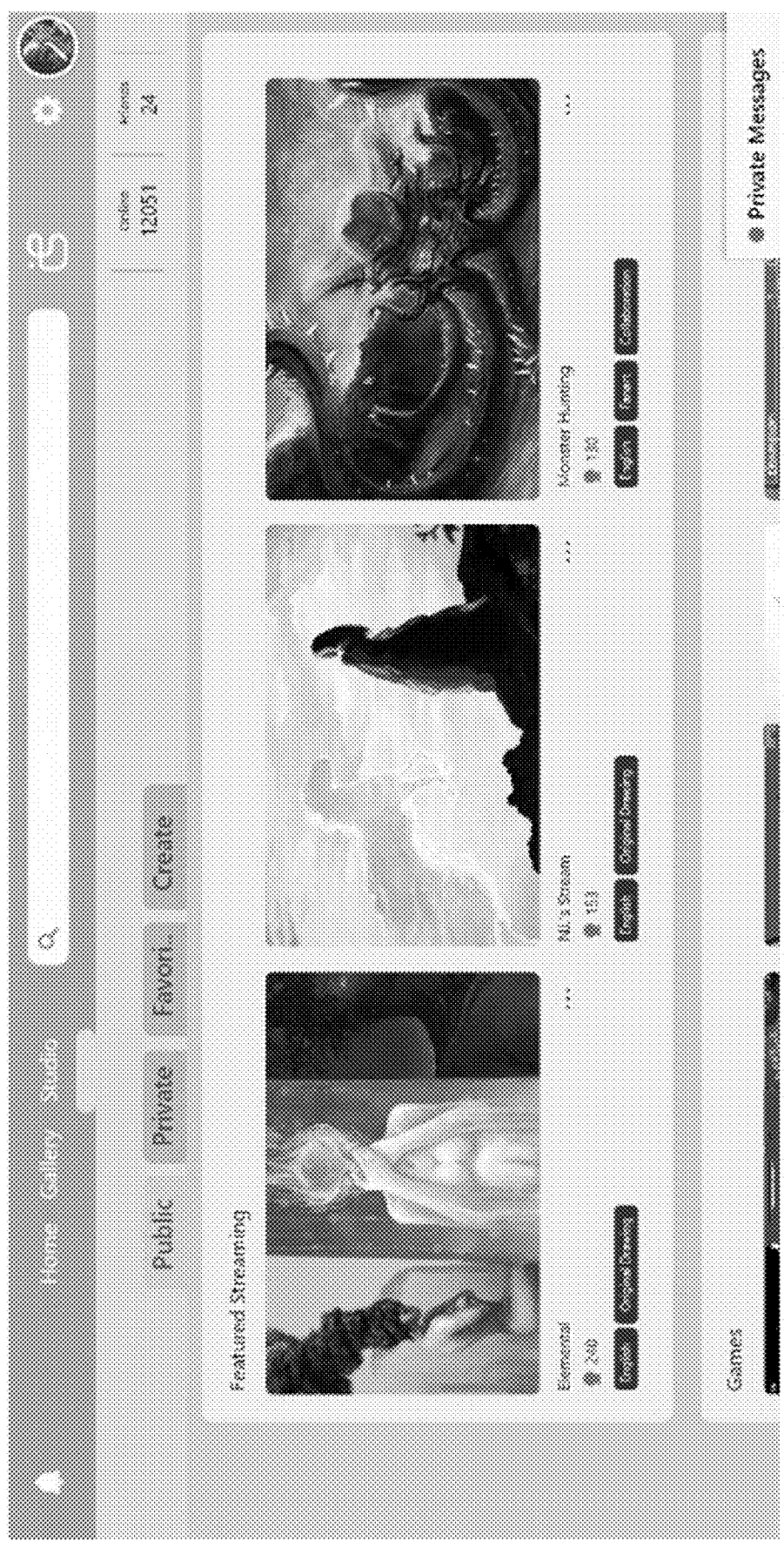
FIG. 16 illustrates a Lobby GUI according to another embodiment of the present invention.

FIG. 16 illustrates a Lobby GUI 2000 according to another embodiment of the present invention. The Lobby GUI 2000 is further operable to indicate any language preferences for a specific session, as well as an indication of whether or not the work of art, either complete or in-progress, displayed in the lobby is an original work of art. Moreover, every session currently being displayed via the Lobby GUI 2000 displays a smaller version of the session's work of art in its current state. In addition, each session displayed via the Lobby GUI 2000 includes at least one session tag. Session tags provide users with a means of expressing the unique content of a current session. For example, if a session is focusing on fan art from an established series, a user can specify, using a session tag, that the session is for "fan art."

In addition to the previously mentioned social media and communication features and functionalities, the platform of the present invention provides users with the means to connect with other users at a professional level. Advantageously, this enables users of the platform to transform all of a user's completed works of art into a professional portfolio. Where traditional platforms limit their functionalities and purpose to just entertainment, the platform of the present invention enables users to turn entertainment into professional development.

Figure 17:
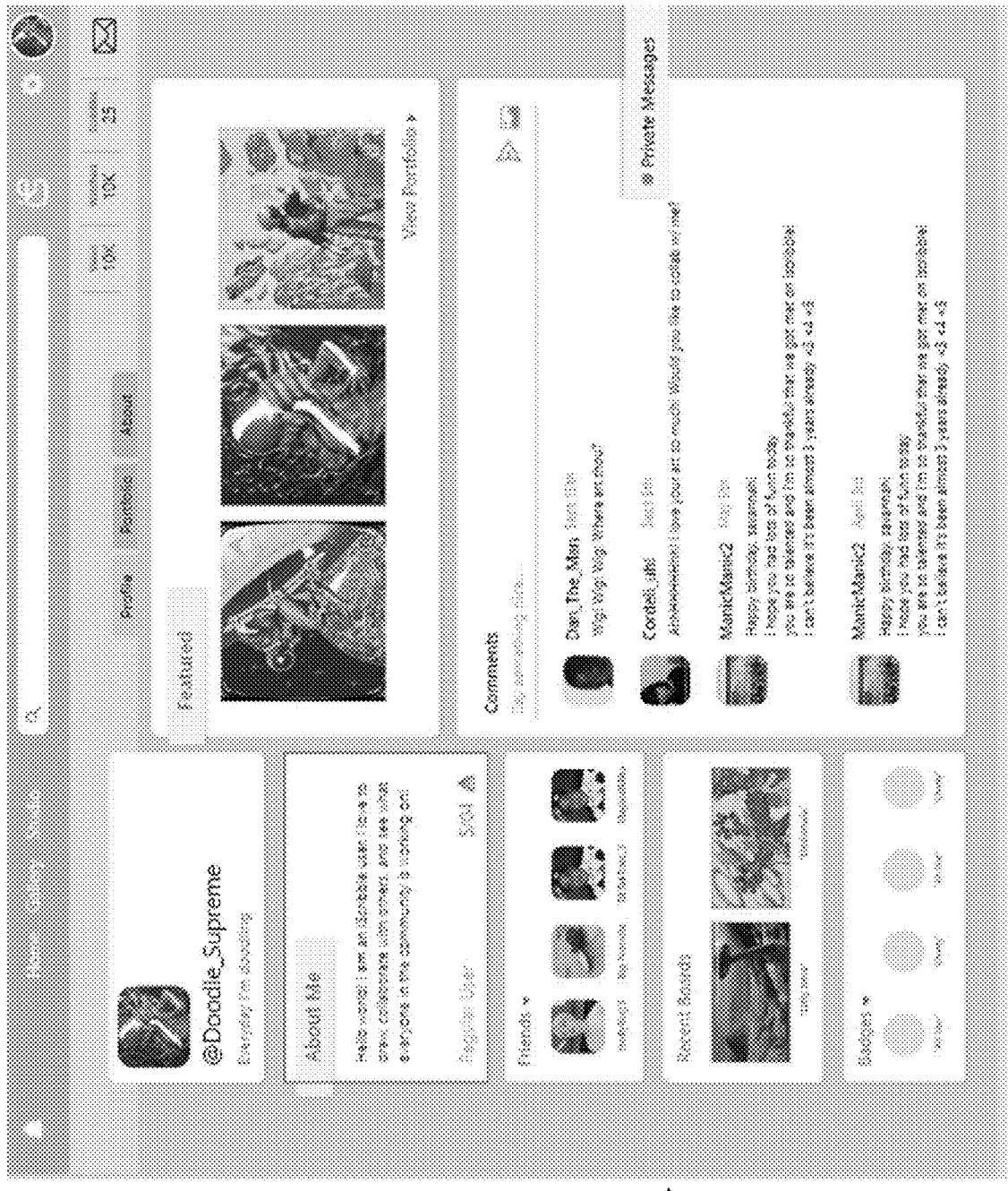
FIG. 17 illustrates a Portfolio GUI according to one embodiment of the present invention.

FIG. 17 illustrates a Portfolio GUI 2100 according to one embodiment of the present invention. The Portfolio GUI 2100 represents a professional extension of a user's activity on the platform. The Portfolio GUI 2100 includes, but is not limited to, a user name heading, a user status message, an About Me text box, a Connections drop-down list, a Recent Activity display, a plurality of completed works of art, a Badges drop-down list, and/or a user comment section.

The About Me text box enables users to input a text-based description of themselves and/or anything they wish to share with other users of the platform. In one embodiment, the About Me text box enables users to input current employment information and/or information relating to a position that a user is seeking to hold. In addition, the About Me text box is operable to further indicate what type of user a user is. For example, if the user's activity on the platform indicates activity that is purely for entertainment, the user type is listed as "Regular User." In another example, if the user has designated themselves as a teacher and/or mentor on the platform, the user type is listed as "Professor" or "Teacher." In yet another example, if the user has indicated a current employment status to the platform, the user type is listed as the user's employee title (e.g., "Senior Designer," "Junior Designer," etc.).

The Connections drop-down list is operable to display all of the users that have established a personal and/or professional relationship on the platform. In one embodiment, establishing this relationship is based on whether or not a particular user has sent and accepted a friend request from another user. In one embodiment, establishing this relationship is based on a user's current employment status. For example, if user A and user B are both employees at company C, the Connections drop-down list is operable to display user B as a connection on user A's Portfolio GUI, and display user A as a connection on user B's Portfolio GUI. In another embodiment, establishing this relationship is based on whether a user has received and accepted a user's professional connection request. As mentioned above, the platform supports a plurality of relationship and/or connection types, operable to indicate whether users are connected for personal reasons, professional reasons, and/or combinations thereof.

The Recent Activity display provides an indication of what sessions a user has recently joined for collaborative purposes, as a spectator, for instructional purposes, and/or any combinations thereof. The Recent Activity display is operable to display a miniature version of any recent sessions, wherein the miniature version is an exact duplicate of the work currently present in a session, but minimized. Thus, the platform enables users to view the platform activity of other users. Advantageously, the Recent Activity display provides users with a timeline of the user's activity, providing a detailed look into what sessions a user has previously joined, what sessions a user has previously completed, an indication of whether or not the user has attended any classroom sessions and/or one-on-one sessions. This provides a unique opportunity for users to better understand both the user's growth as an artist and the user's professional development. Typically, users of traditional platforms are required to make use of multiple platforms in order to both make professional connections and display works of art. Unlike these platforms, the platform of the present invention enables these interactions, connections, and/or sharing of artwork to occur in a single location.

The plurality of completed works of art, displayed via the Portfolio GUI, enables users to select individual completed works of art that the user wants to highlight and/or feature. This provides users with a space to display the user's best works of art to all users of the platform, further enabling users to showcase a variety of skills and/or techniques through completed works of art.

The Badges drop-down list, displayed via the Portfolio GUI, enables users to showcase any acquired badges on the platform. In one embodiment, badges are made available to users upon completion of events and/or challenges on the platform. In one embodiment, badges are made available to users upon completing platform milestones. Milestones include, but are not limited to, collaborating on a specific number of works of art, completing a specific number of works of art, attending a specific number of streaming sessions, participating in one or more events, winning one or more events, completing a specific number of works of art on the platform, being a member of the platform for a certain time period, collaborating on a specific number of works of art, collaborating on a specific number of works of art authored by a specific number of different artists, rating a specific number of works of art present on the platform, connecting with a specific number of users on the platform, increasing a user skill level, and/or any other milestone based on quantifiable metrics for the platform.

The user comment section, displayed via the Portfolio GUI, provides platform users with an area to comment on the artwork of other users. Advantageously, this provides users with the ability to receive a constant stream of user-feedback, twenty-four hours a day. The platform enables users to share a plurality of content via the user comment section including, but not limited to, text, images, audio, videos, Graphics Interchange Formats (GIFs), and/or comments in any other multi-media format not listed. In one embodiment, users are able to enable or disable the user comment section displayed via the Portfolio GUI.

In addition to the Portfolio GUI serving as a highlight for a user's completed and/or in-progress works of art, the Portfolio GUI further enables users to connect with other users who are looking to employ artists capable of producing a particular style of art.

For example, employer A is looking to hire a new artist capable of creating and/or producing art similar in style to style B. Employer A posts this request on the platform via the Portfolio GUI. In addition, Employer A attaches drawing C as a representation of style B. The platform, using the aforementioned AI, ML, NLP, and/or assessment features and/or functionalities, is operable to connect employer A with at least one user with art on the platform of substantially similar style and/or quality to style B and/or drawing C. In addition to the previously mentioned assessment tools, the platform is operable to identify these connections using any of the elements present on the platform (e.g., session tags, session type, session descriptions, user interests, etc.).

In another example, employer A is looking to hire an artist with high skill level and an artist who is proficient in a particular style, style B. The platform enables employer A to post a request, via the Portfolio GUI for an artist with a matching skill level and proficiency in style B. The platform is operable to identify and/or connect users to employer A based on the assessment features and/or functionalities. The platform is further operable to return at least one user with the specified skill level and proficiency in style B.

In one embodiment, the aforementioned employer-employee identification and/or connection functionalities are available for personal connections on the platform (e.g., connections between users not seeking an employer-employee relationship).

In one embodiment, the platform enables employers to post requests for employees using a GUI other than the Portfolio GUI.

Thus, the platform of the present invention is operable to provide not only a platform for entertainment, but a platform operable to connect users to one another at a professional level, leading to future employment opportunities. Advantageously, this provides potential employers with the means to quickly assess, identify, and/or connect with potential employees, from the pool of all platform users, using the platform's assessment features and/or functionalities.

In addition to the previously mentioned social networking and communication functionalities, the collaborative art and communication platform is operable to provide users with a marketplace where completed works of art can be sold to other users of the platform. The marketplace enables users to select completed works of art to be placed for sale on the platform. Where a completed work of art has more than one user and/or creator, the platform requires that all users and/or creators permit the work of art to be sold on the platform. With the permission of each user and/or creator, upon the sale of the work of art the proceeds will be split evenly among the corresponding authors and/or creators. In one embodiment, the platform enables users and/or creators to select a contribution value corresponding to a specified user's overall contribution to the work of art. For example, where a work of art has three users and/or creators responsible for its creation, the platform enables the users and/or creators to specify contribution levels for each user and/or creator (e.g., user one contributed 30%, user two contributed 50%, and user three contributed 20%).

Figure 18:
FIG. 18 illustrates an original character creation GUI according to one embodiment of the present invention.

FIG. 18 illustrates an original character creation GUI 2200 according to one embodiment of the present invention. The original character creation GUI 2200 is divided into different canvases 2201, wherein each canvas is assigned to a user. FIG. 18 illustrates an original character creation GUI 2200 with three canvases, with a user assigned to each canvas. However, the original character creation GUI 2200 is operable to include any number of canvases. The original character is operable to be a character which has been previously depicted or a character which has not been previously depicted and is completely original. The users receive a prompt or request for creation of an original character through a message notification, a chat box of the GUI 2200, or any other mechanism known in the art from another user or through the platform. The request for creation of an original character includes a description of the character, an image of the character, or a link to the character if the character already exists. In one embodiment, all users receive the same prompt or request for drawing an original character. Alternatively, each user receives a different prompt or request for drawing an original character, with each different prompt or request directed to a different character. Although FIG. 18 depicts creation of original characters, the present invention also provides for creation of other original art or graphics such as objects, plants, animals, landscapes, company logos, product designs, patterns for products or packaging, etc. The vertical sidebar on the GUI 2200 includes a list of users who have requested that an original character be drawn. Once a user has agreed to draw the original character, the name of the requesting user is crossed out on the vertical sidebar.

Figure 19:
FIG. 19 illustrates a competition GUI according to one embodiment of the present invention.
Figure 20:
FIG. 20 illustrates a competition GUI according to one embodiment of the present invention.

FIG. 19 illustrates a competition GUI 2300 according to one embodiment of the present invention. The competition GUI 2300 is divided into different canvases 2201, wherein each canvas is assigned to a user. In one embodiment, each canvas is assigned to multiple users on the same team, wherein the canvas is operable to receive inputs from the multiple users on the same layer and/or on different layers of the canvas. FIG. 19 illustrates a competition GUI 2300 with two canvases, with a user assigned to each canvas. However, the competition GUI 2300 is operable to include any number of canvases. The users receive a prompt through a message notification, a chat box of the GUI 2300, or any other mechanism known in the art from another user or through the platform. The prompt includes a description of the subject matter for the competition, with the description being operable to include text related to the subject matter, an image of the subject matter, or a link to information about the subject matter. Preferably, all users in the competition receive the same prompt. Although FIG. 19 depicts a competition involving drawing of characters, the present invention also provides for creation of other original art or graphics such as objects, plants, animals, landscapes, company logos, product designs, patterns for products or packaging, etc. The competition GUI 2300 preferably includes a time limit for drawing, with drawing functionality for the canvases being disabled after the time limit has expired. The time limit is operable to be any time limit known in the art, such as 5 minutes, 10 minutes, 30 minutes, 1 hour, 1 day, etc. Alternatively, there is no time limit for the competition and the competition lasts forever or until each user indicates they have completed their drawing on the canvas. After the time limit has expired, voting is enabled for the canvases. In one embodiment, voting is for a favorite canvas out of the multiple canvases. Additionally or alternatively, voting includes multiple categories where voters vote for their favorite canvas for multiple attributes including by way of example and not limitation, originality, use of color, how closely the drawing matches the prompt for the drawing, and any other attribute known in the art. The users who created the prompt for the competition, an audience of users who viewed the competition, and/or other users who did not view the competition are operable to vote. Preferably, the voting includes a time limit, such as 5 minutes, 10 minutes, 30 minutes, 1 hour, 1 day, etc. FIG. 19 includes a horizontal bar at the bottom of the interface which includes user names or team names, a topic, and a time remaining for the competition. A winning user of the competition earns the right to compete in the next competition. The vertical bar in the center of the GUI 2300 represents slots for users to sign up to compete in the next competition. In one embodiment, the user who has been waiting the longest to compete is selected to compete in the next competition. Alternatively, the winning user of the competition selects the user to compete against. FIG. 20 illustrates another competition GUI 2300 according to one embodiment of the present invention. In one embodiment, a timer or countdown clock is utilized to indicate time remaining in the competition.

Figure 21:
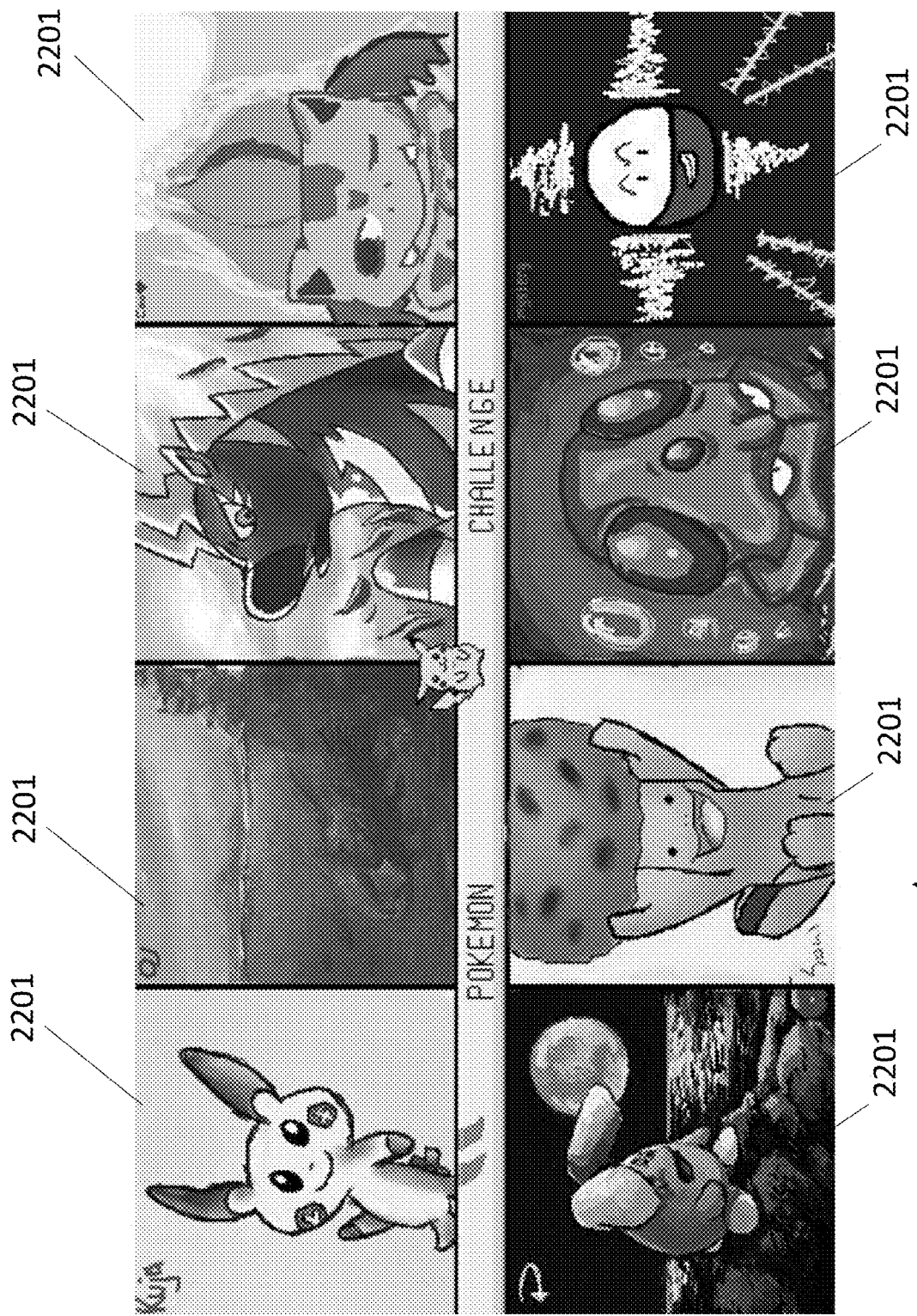
FIG. 21 illustrates a drawing game GUI according to one embodiment of the present invention.
Figure 22:
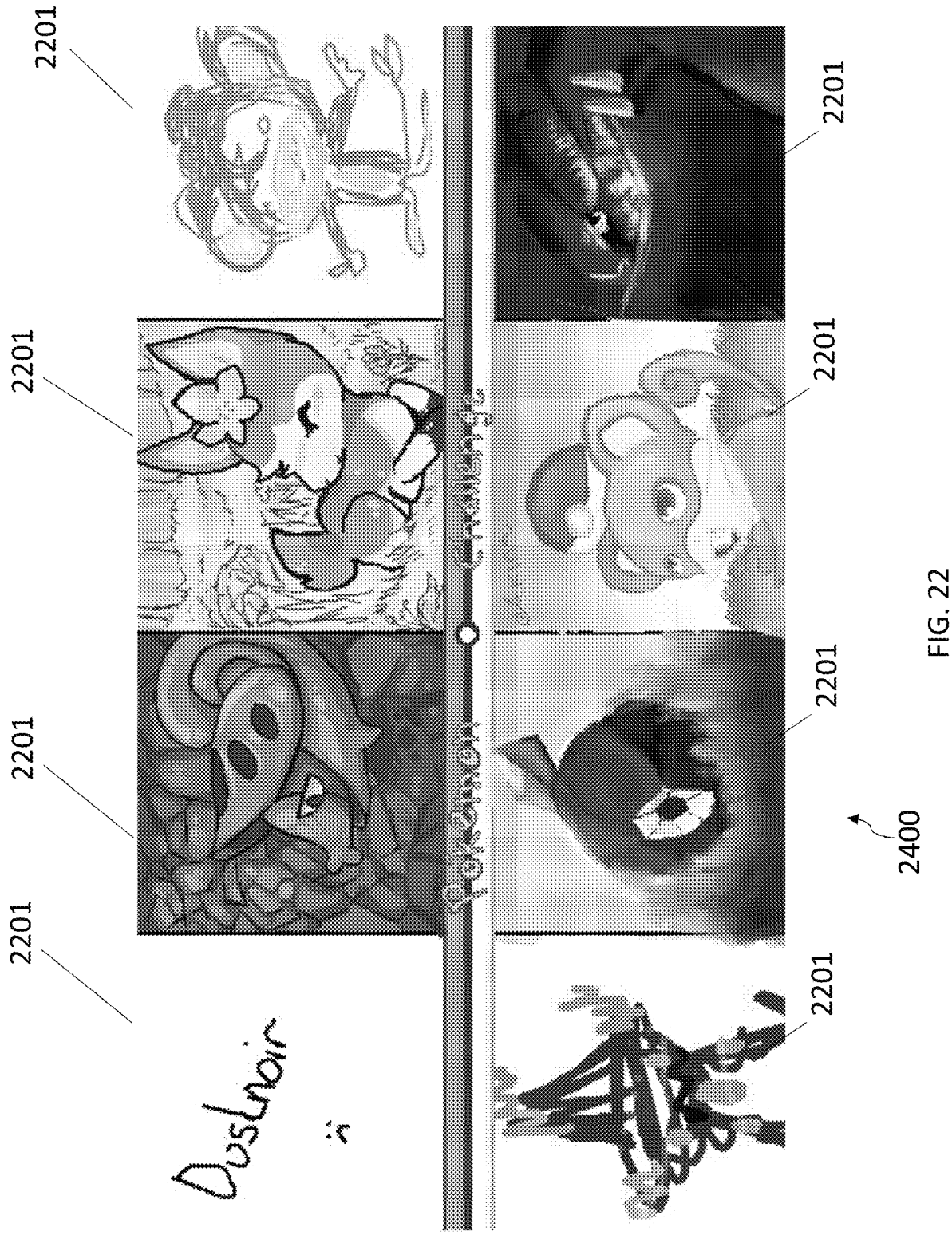
FIG. 22 illustrates a drawing game GUI according to one embodiment of the present invention.

FIG. 21 illustrates a drawing game GUI 2400 according to one embodiment of the present invention. The drawing game GUI 2400 is divided into different canvases 2201, wherein each canvas is assigned to a user. In one embodiment, each canvas is assigned to multiple users on the same team, wherein the canvas is operable to receive inputs from the multiple users on the same layer and/or on different layers of the canvas. FIG. 21 illustrates a drawing game GUI 2400 with eight canvases, with a user assigned to each canvas. However, the drawing game GUI 2400 is operable to include any number of canvases. The users receive a prompt through a message notification, a chat box of the GUI 2400, or any other mechanism known in the art from another user or through the platform. In FIG. 21, the prompt is included in a horizontal bar approximately in the center of the GUI 2400. The prompt includes a description of the subject matter for the drawing game, with the description being operable to include text related to the subject matter, an image of the subject matter, or a link to information about the subject matter. Preferably, all users in the drawing game receive the same prompt. Although FIG. 21 depicts a drawing game involving drawing of characters, the present invention also provides for creation of other original art or graphics such as objects, plants, animals, landscapes, company logos, product designs, patterns for products or packaging, etc. The drawing game GUI 2400 preferably includes a time limit for drawing, with drawing functionality for the canvases being disabled after the time limit has expired. The time limit is operable to be any time limit known in the art, such as 5 minutes, 10 minutes, 30 minutes, 1 hour, 1 day, etc. Alternatively, there is no time limit for the drawing game and the drawing game lasts forever or until each user indicates they have completed their drawing on the canvas. After the time limit has expired, voting is enabled for the canvases. In one embodiment, voting is for a favorite canvas out of the multiple canvases. Additionally or alternatively, voting includes multiple categories where voters vote for their favorite canvas for multiple attributes including by way of example and not limitation, originality, use of color, how closely the drawing matches the prompt for the drawing, and any other attribute known in the art. The users who created the prompt for the drawing game, an audience of users who viewed the drawing game, and/or other users who did not view the drawing game are operable to vote. Upon conclusion of the drawing game, the platform is operable to receive a selection of a topic from the user who was voted the winner of the drawing game. The topic is selected from a predetermined list of topics in one embodiment. Alternatively, the topic is a custom entry by the user who won the drawing game. FIG. 22 illustrates another drawing game GUI 2400 according to one embodiment of the present invention.

Figure 23:
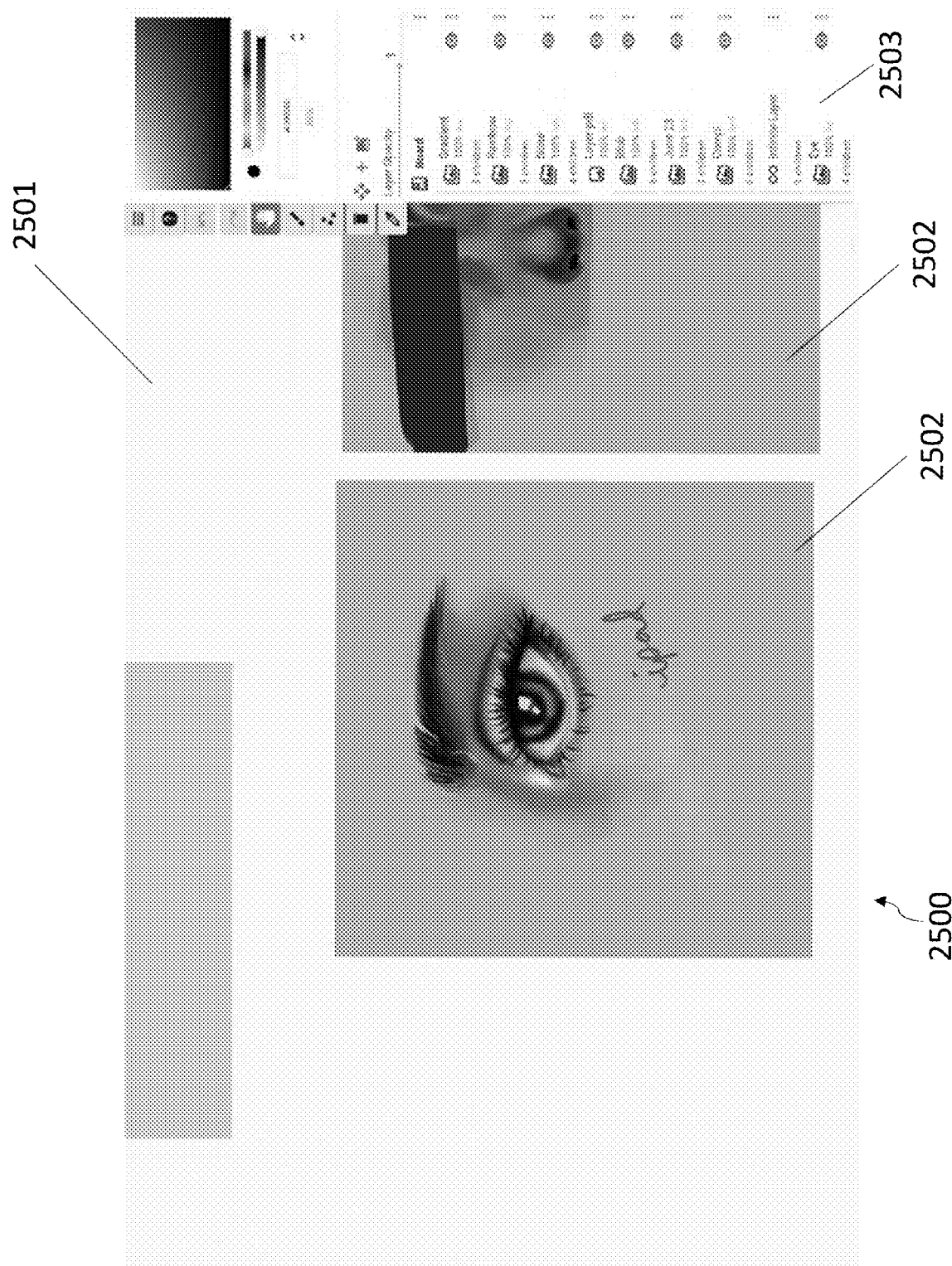
FIG. 23 illustrates a GUI including an infinitely scrolling canvas according to one embodiment of the present invention.

FIG. 23 illustrates a GUI including an infinitely scrolling canvas according to one embodiment of the present invention. The infinitely scrolling canvas GUI 2500 includes a board 2501 which holds the infinitely scrolling canvas. The board includes tile objects 2502, with each tile object 2502 including at least one layer. The tile objects included in FIG. 23 are rectangular; however, any shape known in the art is operable to be utilized for a tile object. Preferably, tile objects are shapes which provide for display of the tile objects together in a repeating pattern, such as squares, pentagons, hexagons, octagons, etc. The infinitely scrolling canvas includes at least one canvas, which holds multiple layers of the same dimension. Multiple layers are operable to be included within each canvas. In one embodiment, canvas elements are operable to be created on the at least one canvas separately from an individual tile object.

Each tile object includes an address for the tile object and/or for each element within the tile object. The address for the tile object or tile object element is operable to be represented by coordinates on the canvas or board. The coordinates are defined numerically in one embodiment, with the top left-hand corner being defined as (0, 0), and each location which is below or to the right of the top left-hand corner of the corner or board being given a numerical address based on the number of pixels down or to the right from the top left-hand corner. For example, a location that is 100 pixels to the right from the top left-hand corner and 200 pixels down from the left-hand corner of the canvas has a location of (100, 200). Alternatively, other methods of defining the location of tile objects or elements of tile objects include an alpha numeric system. In one embodiment, the canvas or board is divided into a grid, with each discrete location on the grid being represented by a unique set of coordinates.

Advantageously, by associating each location on the canvas or board with an address, the present invention provides for linking between locations on the canvas. In one embodiment, click activation of a canvas element which includes a hyperlink causes the GUI to be redirected to display another portion of the canvas or board. A directory is included in one embodiment, with the directory providing links for displaying a predetermined section of the canvas or board via the GUI.

The infinitely scrolling canvas GUI further includes a tile object list 2503 which includes a list of the tile objects and the layers associated with each tile object. Each tile object is operable to be expanded within the tile object list 2503 to show the layers of the tile object. Additionally, each tile object and each layer includes an associated account image in one embodiment which indicates the owner of the tile object or layer. In another embodiment, each tile object and/or each layer includes associated images representing the active user accounts for each tile object and/or each layer. In one embodiment, a link is included with each tile object in the tile object list 2503 which causes the infinitely scrolling canvas GUI to display the tile object in its location on the infinitely scrolling canvas GUI.

Figure 24:
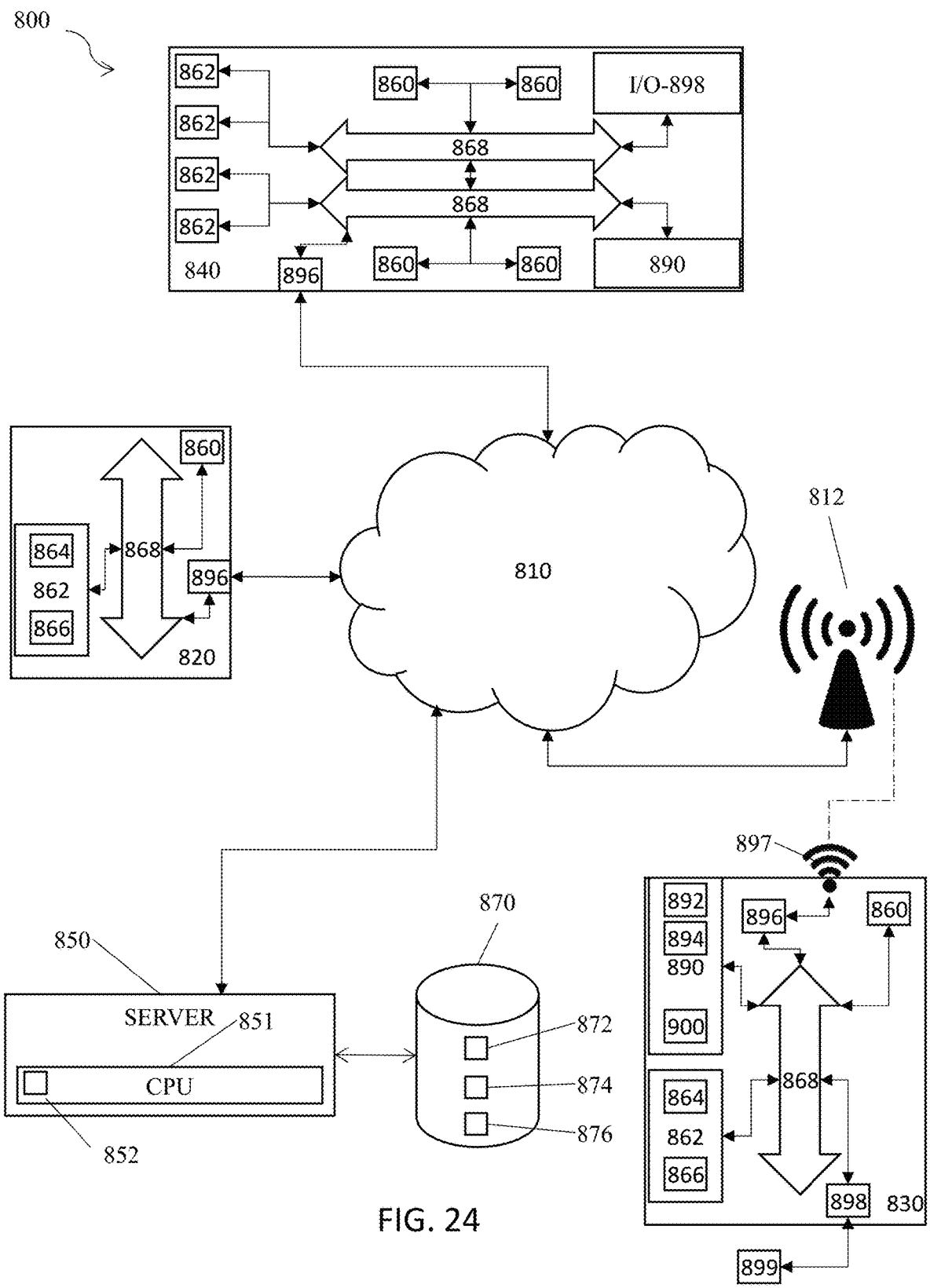
FIG. 24 illustrates a schematic diagram of a system of the present invention.

FIG. 24 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, signal generation devices (e.g., speakers), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 24, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 24, is operable to include other components that are not explicitly shown in FIG. 24, or is operable to utilize an architecture completely different than that shown in FIG. 24. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

The above-mentioned examples are provided to serve the purpose of clarifying the aspects of the invention, and it will be apparent to one skilled in the art that they do not serve to limit the scope of the invention. By nature, this invention is highly adjustable, customizable and adaptable. The above-mentioned examples are just some of the many configurations that the mentioned components can take on. All modifications and improvements have been deleted herein for the sake of conciseness and readability but are properly within the scope of the present invention.

The invention claimed is:

1. A web-based collaboration platform for creating a work of art comprising:
a server including a processor, a memory, and a database;
a Graphical User Interface (GUI) accessible via at least two devices connected over a network to the server; and
an application on a first device of the at least two devices;
wherein the GUI provides for editing of a canvas in real-time via at least one input mechanism by at least two accounts associated with the at least two devices;
wherein the canvas includes at least two layers, wherein edits to one layer of the at least two layers are separate from edits to other layers of the at least two layers;
wherein each layer is assigned to an assigned device of the at least two devices and is editable only by the assigned device;
wherein the database is operable to save each distinct input made via the at least one input mechanism to the at least two layers of the canvas;
wherein the GUI is operable to provide playback of the inputs made to the at least two layers of the canvas, thereby providing for a step-by-step recreation of the work of art after completion of the work of art; and
wherein the application provides for offline editing of the canvas via a secondary version of the canvas saved on the first device of the at least two devices when the first device is not connected to the network, wherein the first device is operable to upload the secondary version of the canvas to the server after the first device is connected to the network and the server is operable to merge the secondary canvas with the canvas.

2. The web-based collaboration platform of claim 1, wherein the at least one input mechanism includes an area picker tool, wherein the area picker tool provides for selection of at least one canvas element and creation of a color representing an average of the colors of the at least one canvas element.

3. The web-based collaboration platform of claim 1, wherein the at least one input mechanism includes an auto-circles tool, wherein the auto-circles tool provides for blending of colors of a selected portion of the canvas to create multiple circles with blends of the colors of the portion of the canvas, wherein each circle of the multiple circles includes a different blend of the colors of the portion of the canvas than the other circles of the multiple circles.

4. The web-based collaboration platform of claim 1, wherein the GUI further includes at least one communication tool, wherein the at least one communication tool provides a text box separate from the canvas for text-based communication between the at least two devices.

5. The web-based collaboration platform of claim 1, wherein the server is operable to implement an asset detection function on the canvas, wherein the asset detection function is operable to detect and identify distinct elements within the work of art in real-time.

6. The web-based collaboration platform of claim 5, wherein the asset detection function is further operable to move the identified distinct elements from the canvas to a second canvas, wherein the identified distinct elements include elements from at least two of the at least two layers, and wherein the identified distinct elements include distinct inputs from the at least two accounts associated with the at least two devices.

7. The web-based collaboration platform of claim 6, wherein the platform is further operable to separate the identified distinct elements into at least two groups of distinct elements.

8. The web-based collaboration platform of claim 1, wherein the server is operable to identify changes made to the secondary version of the canvas, present the changes made to the secondary version of the canvas via the GUI, and perform a color blending function based on color data present in the canvas and the secondary version of the canvas, wherein the color blending function includes analyzing color data in the canvas and the secondary version of the canvas and blending colors of the canvas and the secondary version of the canvas based on the analysis of the color data in the canvas and the secondary version of the canvas.

9. The web-based collaboration platform of claim 1, wherein the GUI further includes a collaboration tree diagram, wherein the collaboration tree diagram includes a history of edits to a canvas in a visual tree format, and wherein the collaboration tree diagram is fixed and static once completed.

10. The web-based collaboration platform of claim 1, wherein the server is further operable to measure attributes of the work of art, wherein the attributes of the work of art include brush stroke quality, line quality, line width, dot patterns, brushstroke patterns, symmetrical attributes, color blending, color contrast, subject matter, clarity of subject matter, geometric composition, fragmentation, skill level, style quality, a time-to-completion, a collaborator count corresponding to the number of collaborators that worked on a particular work of art, and/or a color variety value, and wherein the server is further operable to assign one or more stylistic categories to the work of art based on the attributes of the work of art.

11. The web-based collaboration platform of claim 1, wherein the GUI includes a teaching mode, wherein a teacher layer associated with a teacher account is operable to be viewed by a plurality of student accounts in real-time and a plurality of student layers is operable to be viewed by the teacher account in real-time, and wherein each of the plurality of student layers is not operable to be viewed by the other student layers, and wherein the platform is operable to generate an assessment score for each of the plurality of student layers by comparing the teacher layer to each of the plurality of student layers upon a session completion.

12. The web-based collaboration platform of claim 1, wherein the GUI further includes a user feed GUI, wherein the user feed GUI includes a list of friend accounts currently active on the platform and/or a list of currently active account streams.

13. The web-based collaboration platform of claim 1, wherein each of the at least two accounts includes a list of styles associated with artwork created by each account and a corresponding proficiency level associated with each style of the list of styles, and wherein the list of styles and corresponding proficiency level associated with each style is searchable by another account.

14. A web-based collaboration platform for creating a work of art comprising:
   a server including a processor, a memory, and a database; and
   a Graphical User Interface (GUI) accessible via at least two devices connected over a network to the server;
   wherein the GUI provides for editing of a canvas in real-time via at least one input mechanism by at least two accounts associated with the at least two devices;
   wherein the canvas includes at least two layers, wherein edits to one layer of the at least two layers are separate from edits to other layers of the at least two layers;
   wherein the GUI further includes a chat GUI operable to receive text input from the at least two devices, wherein the text input is operable to be viewed by the at least two devices;
   wherein the GUI further includes an account feed GUI, wherein the account feed GUI includes a list of friend accounts currently active on the platform, a list of currently active account streams, favorited sessions, recent posts from other accounts, on-going events, and/or recommended sessions or recommended friend accounts; and
   wherein the server is further operable to measure attributes of the work of art, wherein the attributes of the work of art include brush stroke quality, line quality, line width, dot patterns, brushstroke patterns, symmetrical attributes, color blending, color contrast, subject matter, clarity of subject matter, geometric composition, fragmentation, skill level, style quality, a time-to-completion, a collaborator count corresponding to the number of collaborators that worked on a particular work of art, and/or a color variety value, and wherein the server is further operable to assign one or more stylistic categories to the work of art based on the attributes of the work of art.

15. The web-based collaboration platform of claim 14, wherein each of the at least two accounts includes a list of styles associated with artwork created by each account and a corresponding proficiency level associated with each style of the list of styles, and wherein the list of styles and corresponding proficiency level associated with each style is searchable by another account.

16. A web-based collaboration platform for creating a work of art comprising:
   a server including a processor, a memory, and a database; and
   a Graphical User Interface (GUI) accessible via at least two devices connected over a network to the server;
   wherein the GUI provides for editing of a canvas in real-time via at least one input mechanism by at least two accounts associated with the at least two devices;
   wherein the at least one input mechanism includes an area picker tool and an auto circles tool;
   wherein the area picker tool provides for selection of at least one canvas element and creation of a color representing an average of the colors of the at least one canvas element; and
   wherein the auto-circles tool provides for blending of colors of a selected portion of the canvas to create multiple circles with blends of the colors of the portion of the canvas, wherein each circle of the multiple circles includes a different blend of the colors of the portion of the canvas than the other circles of the multiple circles.

17. The web-based collaboration platform of claim 16, wherein the server is operable to implement an asset detection function on the canvas, wherein the asset detection function is operable to detect and identify distinct elements within the work of art in real-time.

18. The web-based collaboration platform of claim 17, wherein the asset detection function is further operable to move the identified distinct elements from the canvas to a second canvas, wherein the identified distinct elements include elements from at least two of the at least two layers, and wherein the identified distinct elements include distinct inputs from the at least two accounts associated with the at least two devices.

* * * * *